US010653112B2

(12) United States Patent
Komatsu et al.

(10) Patent No.: US 10,653,112 B2
(45) Date of Patent: May 19, 2020

(54) INFORMATION PROCESSING SYSTEM AND METHOD FOR MANAGING GROUPS OF INDIVIDUALS

(71) Applicant: SONY CORPORATION, Tokyo (JP)

(72) Inventors: Hiromitsu Komatsu, Kanagawa (JP);
Masakazu Yajima, Kanagawa (JP);
Yasushi Ihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,021

(22) PCT Filed: Jan. 13, 2017

(86) PCT No.: PCT/JP2017/001003
§ 371 (c)(1),
(2) Date: Jul. 13, 2018

(87) PCT Pub. No.: WO2017/130736
PCT Pub. Date: Aug. 3, 2017

(65) Prior Publication Data
US 2019/0008124 A1 Jan. 10, 2019

(30) Foreign Application Priority Data
Jan. 29, 2016 (JP) .................................. 2016-015097

(51) Int. Cl.
*A01K 11/00* (2006.01)
*G06F 3/048* (2013.01)
(Continued)

(52) U.S. Cl.
CPC ............ *A01K 11/008* (2013.01); *G06F 3/048* (2013.01); *G06F 3/04817* (2013.01); *G06F 3/14* (2013.01);
(Continued)

(58) Field of Classification Search
CPC ........ G06T 11/203; G06T 11/60; G06F 3/048; G06F 3/04817; G06F 3/04842; A01K 11/008
See application file for complete search history.

(56) References Cited

U.S. PATENT DOCUMENTS

2008/0086509 A1* 4/2008 Wallace ................ G06F 16/285
2008/0097731 A1* 4/2008 Lanes .................. G06Q 10/087
703/2
2010/0134626 A1 6/2010 Icho et al.

FOREIGN PATENT DOCUMENTS

JP 10-160820 A 6/1998
JP 2015-125482 A 7/2015
(Continued)

OTHER PUBLICATIONS

International Search Report and Written Opinion of PCT Application No. PCT/JP2017/001003, dated Apr. 4, 2017, 08 pages of ISRWO.

*Primary Examiner* — Michelle L Sams
(74) *Attorney, Agent, or Firm* — Chip Law Group

(57) ABSTRACT

According to an embodiment of the present technology, there is provided an information processing apparatus including: a group extraction unit; and a display control unit. The group extraction unit extracts a plurality of group constituent individuals belonging to a group from a plurality of individuals on the basis of individual information items of each of the plurality of individuals. The display control unit causes a display unit to display a shape of a region occupied by the group as a group indication in a map image on the basis of a distribution of position information items of a plurality of peripheral constituent individuals that form a periphery of the group among the plurality of group constituent individuals.

20 Claims, 27 Drawing Sheets

(51) Int. Cl.
    *G06F 3/0481*     (2013.01)
    *G06F 3/14*       (2006.01)
    *G06T 11/20*      (2006.01)
    *G06T 11/60*      (2006.01)
    G06Q 50/02        (2012.01)
    G06F 3/0484       (2013.01)

(52) U.S. Cl.
    CPC ............ *G06T 11/203* (2013.01); *G06T 11/60* (2013.01); *G06F 3/04842* (2013.01); *G06Q 50/02* (2013.01)

(56) References Cited

FOREIGN PATENT DOCUMENTS

| | | |
|---|---|---|
| WO | 2008/139717 A1 | 11/2008 |
| WO | 2013/145329 A1 | 10/2013 |

\* cited by examiner

| Livestock animal ID | Group |
|---|---|
| 17213 | A |
| 12420 | A |
| 10350 | A |
| 14173 | A |
| ⋮ | |
| 13020 | B |
| 11352 | B |
| 15183 | B |
| ⋮ | |

FIG.12

| Livestock animal ID | Attribute |
|---|---|
| 17213 | Leader |
| 12420 | |
| 10350 | |
| 14173 | |
| ⋮ | |
| 13020 | Child |
| 11352 | |
| 15183 | |
| ⋮ | |

INFORMATION PROCESSING SYSTEM AND METHOD FOR MANAGING GROUPS OF INDIVIDUALS

CROSS REFERENCE TO RELATED APPLICATIONS

This application is a U.S. National Phase of International Patent Application No. PCT/JP2017/001003 filed on Jan. 13, 2017, which claims priority benefit of Japanese Patent Application No. JP 2016-015097 filed in the Japan Patent Office on Jan. 29, 2016. Each of the above-referenced applications is hereby incorporated herein by reference in its entirety.

TECHNICAL FIELD

The present technology relates to an information processing apparatus, an information processing system, and an information processing method that can be used, for example, in management of livestock animals.

BACKGROUND ART

As a method of breeding livestock animals such as cattle, there has been known free-range grazing of allowing the livestock animals to freely eat fresh forage in grasslands. Grazing allows the livestock animals to sufficiently exercise, to breathe flesh outside air, and to be drenched in sunlight. Thus, grazing has been said to be good for the health of the livestock animals. Further, there have been other breeding methods of using a free-stall barn and preparing a space therein where the livestock animals are not leashed and allowed to freely stroll.

Meanwhile, during the livestock free-range grazing, it is difficult to grasp positions of and to manage the livestock animals.

In view of such circumstances, there has been a range-livestock remote management system as disclosed in Patent Literature 1, which notifies of the positions/behavior patterns of the livestock animals in real time from a position away from the range livestock animals.

CITATION LIST

Patent Literature

Patent Literature 1: Japanese Patent Application Laid-open No. H10-160820

DISCLOSURE OF INVENTION

Technical Problem

Generally, the livestock animals behave in a herd (group), and a manager of the livestock animals may manage the livestock animals on a herd-by-herd basis. However, in the range-livestock remote management system disclosed in Patent Literature 1, it is difficult to intuitively understand a distribution and movements of the herds.

In view of such circumstances, the present technology has been made to achieve an object to provide an information processing apparatus, an information processing system, and an information processing method that enable groups of individuals such as livestock animals to be intuitively grasped.

Solution to Problem

In order to achieve the above-mentioned, according to an embodiment of the present technology, there is provided an information processing apparatus including: a group extraction unit; and a display control unit.

The group extraction unit extracts a plurality of group constituent individuals belonging to a group from a plurality of individuals on a basis of individual information of each of the plurality of individuals.

The display control unit controls a display unit to display a shape of a region occupied by the group as a group indication in a map image on a basis of a distribution of position information items of a plurality of peripheral constituent individuals that form a periphery of the group among the plurality of group constituent individuals.

According to another embodiment of the present technology, there is provided an information processing system including: an individual-information generation unit; a group extraction unit; and a display control unit.

The individual-information generation unit generates, on a basis of individual signals transmitted from transmission apparatuses attached respectively to a plurality of individuals, individual information of each of the plurality of individuals.

The group extraction unit extracts a plurality of group constituent individuals belonging to a group on a basis of the individual information items.

The display control unit controls a display unit to display a shape of a region occupied by the group as a group indication in a map image on a basis of a distribution of position information items of a plurality of peripheral constituent individuals that form a periphery of the group among the plurality of group constituent individuals.

According to still another embodiment of the present technology, there is provided an information processing method executed by an information processing apparatus, including the steps of:

extracting a plurality of group constituent individuals belonging to a group from a plurality of individuals on a basis of individual information of each of the plurality of individuals; and controlling a display unit to display a shape of a region occupied by the group as a group indication in a map image on a basis of a distribution of position information items of a plurality of peripheral constituent individuals that form a periphery of the group among the plurality of group constituent individuals.

Advantageous Effects of Invention

As described above, according to the present technology, it is possible to provide an information processing apparatus, an information processing system, and an information processing method that enable groups of individuals such as livestock animals to be intuitively grasped.

Note that, the advantages disclosed herein are not necessarily limited to those described hereinabove, and all the advantages disclosed herein can be obtained.

BRIEF DESCRIPTION OF DRAWINGS

FIG. 12 A view showing an example of a table including individual-identification information items and group information items stored in a group-information storage unit shown in FIG. 11.

MODE(S) FOR CARRYING OUT THE INVENTION

Now, embodiments according to the present technology are described with reference to the drawings.

[Summary of Livestock Management System]

In the embodiments herein, a livestock management system is described as an embodiment of an information processing system. This livestock management system, which can be utilized, for example, by livestock farmers and workers (users) in stockbreeding facilities, is configured to be capable of intuitively displaying herds of livestock animals (hereinafter, referred to as group) in the stockbreeding facility.

Note that, the livestock animals are an embodiment of "individuals," and the individuals refer to living bodies. Further, as described below, the present technology is applicable not only to the individuals, but also to objects being non-living bodies. In addition, the "group" refers to an aggregate of the plurality of individuals, and is not limited to the herds of livestock animals.

Figure 1:
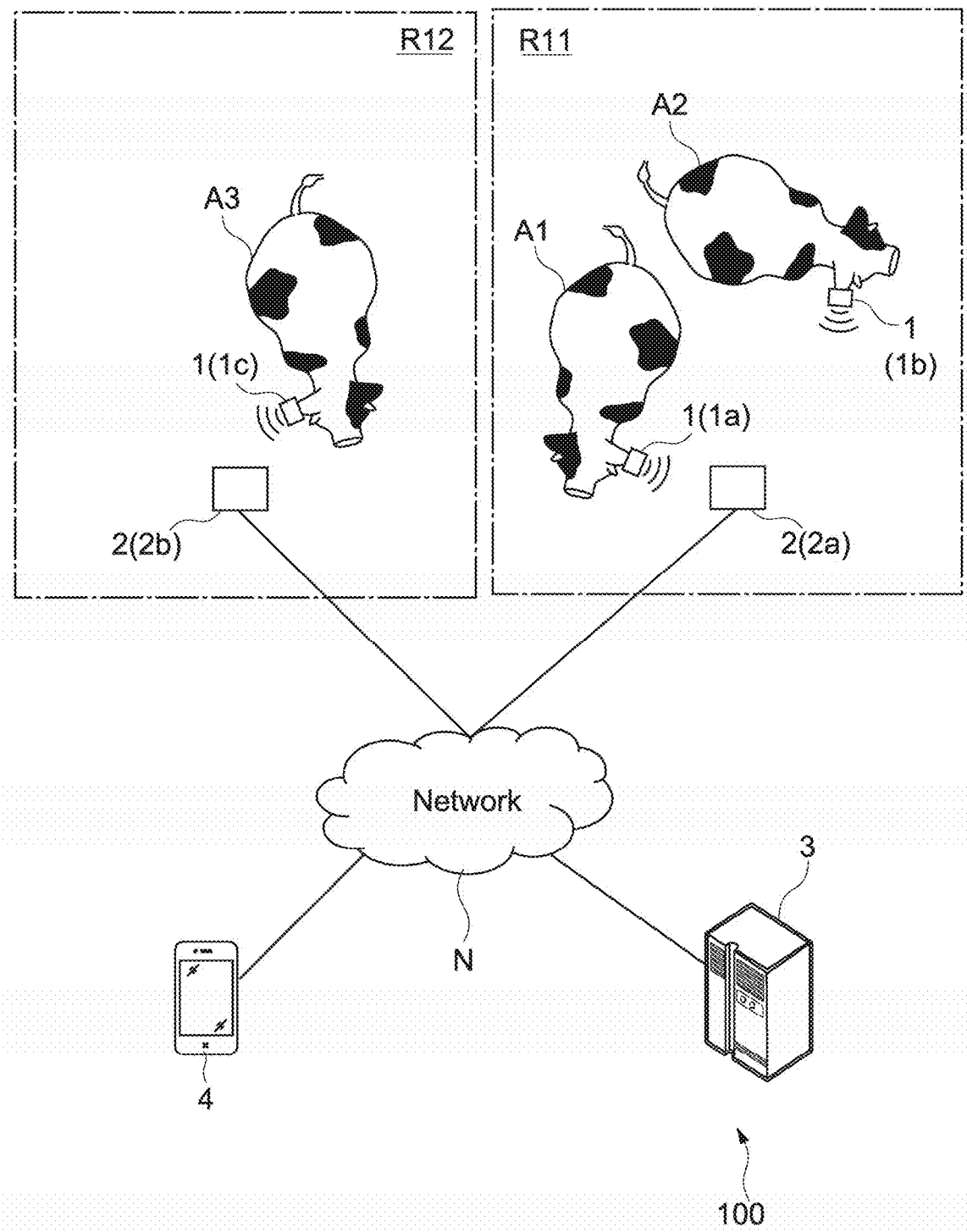
FIG. 1 A schematic view showing a schematic configuration of a livestock management system according to a first embodiment of the present technology.

FIG. 1 is a schematic view showing a schematic configuration of a livestock management system according to a first embodiment of the present technology.

As shown in FIG. 1, a livestock management system 100 includes a plurality of transmission apparatuses 1 (transmission apparatuses 1a, 1b, and 1c), a plurality of relay apparatuses 2, (relay apparatuses 2a and 2b), a server apparatus 3, and a terminal apparatus 4.

The plurality of transmission apparatuses 1a, 1b, and 1c are attached respectively to a plurality of livestock animals A1, A2, and A3.

As examples of the livestock animals A1, A2, and A3, there may be mentioned industrial animals such as beef cattle, cows, pigs, horses, sheep, goats, and poultry, and pets such as dogs, cats, and rabbits. In the following, cows are taken as an example.

The transmission apparatuses 1 are attached to the livestock animals, and transmit individual signals. The individual signals are signals including information items of the individuals. In this embodiment, the individual signals may include individual-identification information items that enable respective identification of the livestock animals. The individual-identification information items may include individual identifiers associated respectively with the individuals.

The individual identifiers are identifiers that enable the identification of the livestock animals. The individual identifiers may be individual identifiers specific to the transmission apparatuses 1, or may be individual identifiers that enable respective identification of the transmission apparatuses 1, such as individual identification numbers described below of the livestock animals.

The individual signals may include information items other than the individual-identification information items, such as information items of a power generation amount described below, information items of attributes of the transmission apparatuses 1, conditions of the livestock animals, and information items combining these information items.

Specifically, the transmission apparatuses 1a, 1b, and 1c can be configured as tags attachable respectively to the livestock animals A1, A2, and A3.

The transmission apparatuses 1 are each attached, for example, to an ear of corresponding one of the livestock animals A1, A2, and A3. However, the transmission apparatus 1 need not necessarily be attached to the ear, and may be attached to a site other than the ear, such as a neck, a back, and a leg. Note that, from a viewpoint of lowering a risk that the transmission apparatus 1 is detached due to behaviors of the livestock animals A1, A2, and A3 to rub themselves against a fence or the like, or their collision with other ones of the livestock animals, it is more preferred that the transmission apparatus 1 be attached to the ear rather than to the neck or the leg.

Further, the livestock animals A1, A2, and A3 may wear wearable objects in addition to the transmission apparatuses 1, which do not have communication functions or the like and indicate information items for identifying the individuals, such as the individual identification numbers. These wearable objects to be attached to the ears are referred to as ear tags. The ear tags each include a resin plate having the individual identification number and its barcode printed thereon.

In addition, the individual identification numbers herein refer to generally-used numbers issued, for example, by a country or a livestock management organization.

Note that, the individual identification number of the livestock animal and the individual identifier of the transmission apparatus 1 may be indicated on a surface of a casing described below of each of the transmission apparatuses 1. In this way, the transmission apparatus 1 may have a function of the ear tag.

The one or more relay apparatuses 2 receive the individual signals transmitted from the transmission apparatuses 1, and transmit information items based on the received individual signals to the server apparatus 3 via a network N. In other words, the relay apparatuses 2 of this embodiment function as relay apparatuses for the individual signals transmitted from the transmission apparatuses 1.

The relay apparatuses 2 may be dedicated communication apparatuses, or may have a configuration similar to that of the transmission apparatuses 1. Alternatively, the relay apparatuses 2 may be information processing apparatuses different from the terminal apparatus 4. In the example shown in FIG. 1, the relay apparatuses 2 are installed in registered regions described below in a stockbreeding facility.

Examples of the network N may include the Internet and a local area network.

The server apparatus 3 is a server apparatus on the network N. In this embodiment, the server apparatus 3 is an apparatus different from the transmission apparatuses 1 and the relay apparatuses 2. The server apparatus 3 is an information processing apparatus that receives the information items transmitted from the relay apparatuses 2. The information items that the server apparatus 3 receives are the information items based on the individual signals, such as information items that the relay apparatuses 2 generate by adding predetermined information items to the individual signals. The server apparatus 3 may be constituted by a single information processing apparatus, or may be constituted by a plurality of information processing apparatuses.

The server apparatus 3 is capable of providing livestock management service to the terminal apparatus 4 via the network N. For example, the server apparatus 3 has livestock-management application software (hereinafter, abbreviated as "livestock management application") installed therein, and executes processes of the software.

The server apparatus 3 may provide the livestock management application in a form of web application to, for example, the terminal apparatus 4, or may distribute the livestock management application to the terminal apparatus 4, and cause the terminal apparatus 4 to install the application therein.

The terminal apparatus 4 is an information processing apparatus to be operated by the user who manages the plurality of livestock animals A1, A2, and A3. The terminal apparatus 4 is configured to be capable of communicating with the server apparatus 3 on the network N. Examples of the terminal apparatus 4 include a smartphone, a tablet terminal, a digital camera, a wearable device, and a PC (Personal Computer). In this embodiment, the terminal apparatus 4 has the livestock management application installed therein, which is provided from the server apparatus 3.

In this context, regions R11 and R12 shown in FIG. 1 are schematic illustration of, for example, the regions in the stockbreeding facility, in which the livestock animals A1, A2, and A3 can stay. These regions are, for example, regions that the user registers in advance via the livestock management application installed in the terminal apparatus 4.

Figure 2:
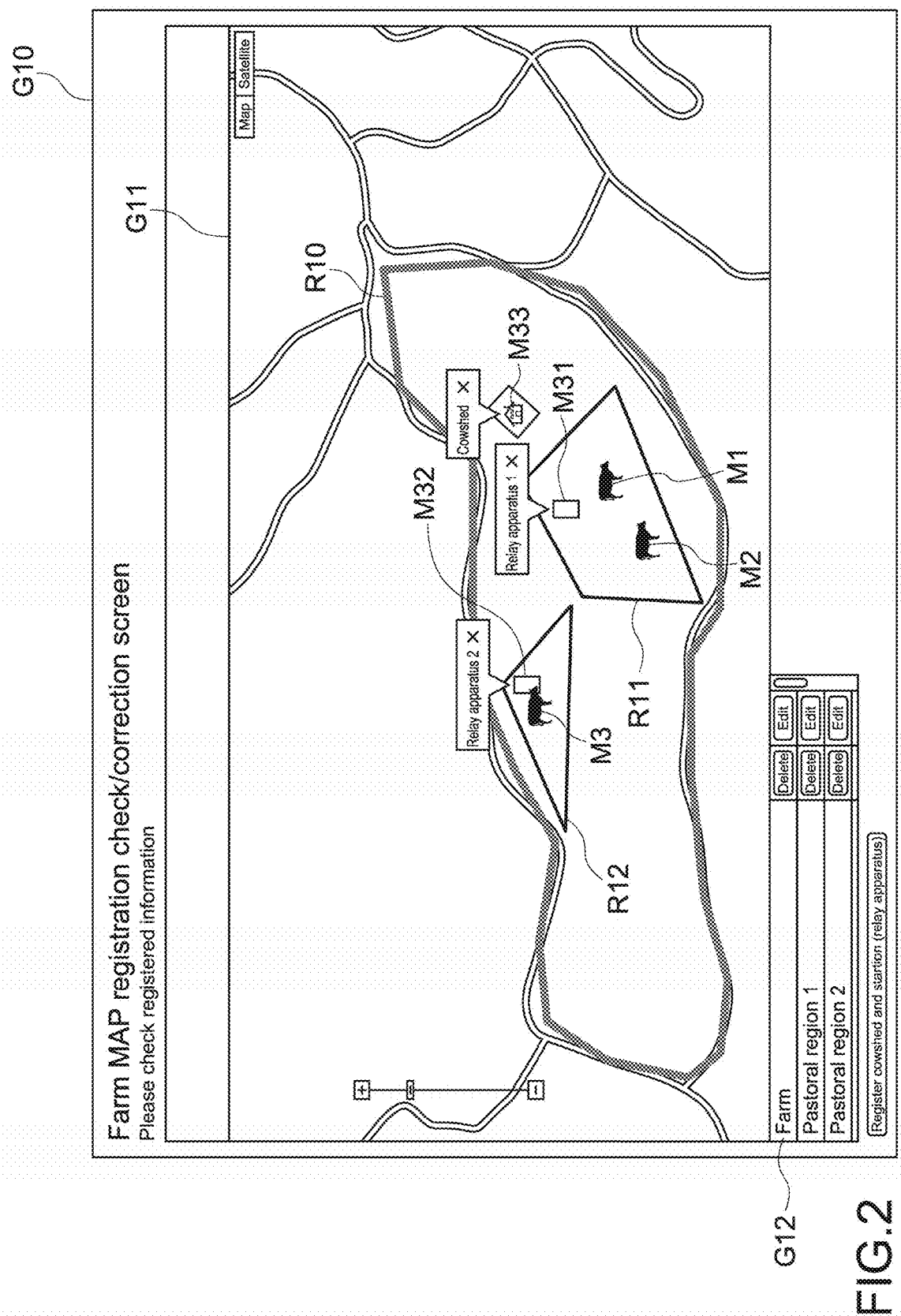
FIG. 2 A schematic view for mainly describing regions shown in FIG. 1.

FIG. 2 is a schematic view showing a specific example of the registered regions, that is, an example of a region check/correction screen G10 that enables checking, correction, and the like of the regions displayed on the terminal apparatus 4.

The region check/correction screen G10 includes a map image G11. The map image G11 further includes a region R10 corresponding to an entirety of the stockbreeding facility, and regions R11 and R12 corresponding to pastoral regions defined in a grazing land in the region R10 in the stockbreeding facility. The pastoral regions are, for example, regions which are sequentially rotated at a time of rotational grazing, and in which the livestock animals can stay over a long period.

Further, in the map image G11, icons M1 to M3 corresponding respectively to the livestock animals A1 to A3, icons M31 and M32 corresponding respectively to the relay apparatuses 2a and 2b, and an icon M33 corresponding to a cowshed are displayed.

In this embodiment, the regions R10, R11, and R12 can be regions registered by the user of the livestock management application (for example, livestock farmer). By using, for example, a delete/edit command G12, the user can delete registrations of these regions R10, R11, and R12 in the map image G11, and edit positions in the map image G11.

The region R10 is registered as a region in which the relay apparatuses 2a and 2b can be installed. Meanwhile, the regions R11 and R12 are registered as regions that can be areas in which the communication via the relay apparatuses 2a and 2b can be performed. Thus, in this embodiment, the plurality of relay apparatuses 2a and 2b (icons M31 and M32) are installed such that the areas in which the communication via the relay apparatuses 2a and 2b can be performed adapt to the registered pastoral regions (regions R11 and R12).

As the regions, a stall and a milking box or parlor defined in a barn may be registered.

Note that, the livestock management application of this embodiment may be configured to be capable of also, for example, registering, editing, and deleting the positions of, for example, the relay apparatuses 2a and 2b and the cowshed.

The icons M1 to M3 corresponding to the livestock animals A1 to A3 can be displayed at corresponding positions in the map image G11 on the basis of position information items of the livestock animals A1 to A3 that the server apparatus 3 and the terminal apparatus 4 acquire on the basis of the individual signals transmitted from the transmission apparatuses 1.

Meanwhile, although the three livestock animals in the examples shown in FIG. 1 and FIG. 2 are shown for the sake of convenience of description, the livestock farmer can manage several tens to several thousands or more livestock animals. In such cases, when icons or the like corresponding to all the livestock animals are to be displayed, a screen may be complicated depending, for example, on density of the livestock animals.

Further, the large number of livestock animals can be managed in groups, and hence the livestock farmer needs to grasp how the groups distribute.

The livestock management system 100 of this embodiment is capable of displaying shapes of regions occupied by the groups as group indications in the map image. With this, the user such as the livestock farmer can easily grasp the shapes of entireties of the groups.

[Hardware Configuration of Livestock Management System]

Figure 3:
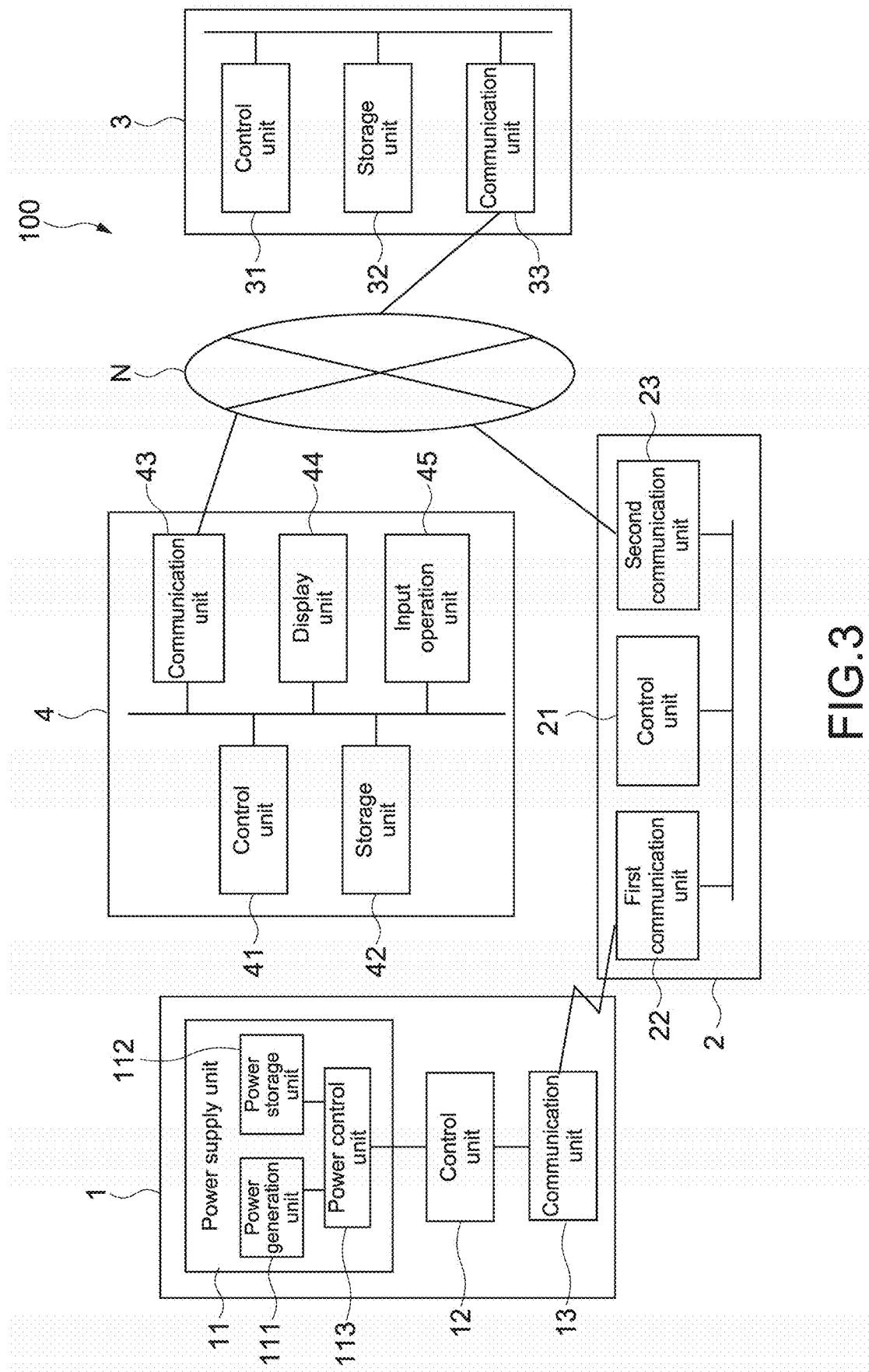
FIG. 3 A block diagram showing hardware configurations of apparatuses included in the livestock management system.

FIG. 3 is a block diagram showing hardware configurations of the apparatuses included in the livestock management system 100. Note that, in FIG. 3, for the sake of convenience of description, one of the transmission apparatuses 1, one of the relay apparatuses 2, the server apparatus 3, and the terminal apparatus 4 are shown.

(Transmission Apparatus)

As shown in FIG. 3, the transmission apparatus 1 includes a power supply unit 11, a control unit 12, and a communication unit 13. The transmission apparatus 1 further includes a casing (not shown) that accommodates the power supply unit 11, the control unit 12, and the communication unit 13, and an attachment mechanism (not shown) for enabling the casing to be attached to the livestock animal. The attachment mechanism may be formed integrally with the casing.

The "attachment" herein encompasses, for example, direct attachment to the individual and/or the object via the wearable object or the like, and indirect attachment to an item that is attached to the individual and/or the object. As an example of the direct attachment of the casing to the individual or the like, there may be mentioned a case where the user uses, for example, an attachment tool such that the ear of the livestock animal is nipped between the casing and another fitting, whereby the casing is attached to the livestock animal. As an example of the indirect attachment of the casing to the individual or the like, there may be mentioned a case where the casing has a belt hole such that a belt wrapped around the neck of the livestock animal is passed through the hole, whereby the casing is attached to the livestock animal. As another example of the indirect attachment of the casing to the individual or the like, there may be mentioned a case where the casing has a structure for enabling a mounting component, which is directly attached to the livestock animal, to be attached thereto such that the casing is attached to the livestock animal via the mounting component.

The power supply unit 11 is configured to be capable of supplying electric power to the control unit 12 and the communication unit 13. The power supply unit 11 includes a power generation unit 111, a power storage unit 112, and a power control unit 113.

The power generation unit 111 generates electric power depending on a surrounding environment. The power generation unit 111 may perform power generation with energy based on at least any one of, for example, light, heat, vibration, radio waves including a far electromagnetic field and a near electromagnetic field, and particular organic and inorganic matters. The power generation unit 111 may perform power generation with energy based on a plurality of these sources. Any power generation method such as an electrostatic type, an electromagnetic type, an inverse magnetostrictive type, or a piezoelectric type can be employed.

The power generation unit 111 may perform power generation with light (for example, that from indoor light bulb and solar light).

The power generation unit 111 may be a thermoelectric conversion element that performs power generation by utilizing a temperature difference (heat) (for example, one that performs power generation by using the Seebeck effect and the Thomson effect, one that performs thermionic power generation, or one that performs thermomagnetic power generation). Such a power generation unit 111 performs power generation by utilizing, for example, a temperature difference between a body temperature of a livestock animal and an ambient temperature.

The power generation unit 111 may be an enzyme battery (also called bio-battery or the like) that performs power generation by utilizing glucose.

The power generation unit 111 utilizes any of LCR (inductance, capacitance, and reactance) components or a combination thereof, and capacitive coupling or electromagnetic coupling with a capacitor, an antenna, a rectenna, and the like. The power generation unit 111 may perform power generation with, for example, radio waves.

The power generation unit 111 may perform near electromagnetic field power generation, that is, perform power generation with energy obtained by bringing the transmission apparatus close to a predetermined device. Well-known methods such as a magnetic field resonance method, an electromagnetic induction method, electric field coupling, and an electric field resonance method are applicable to a method for the near electromagnetic field power generation.

Well-known power generation units 111 other than those exemplified above are applicable to the power generation unit 111.

The power storage unit 112 is used depending on purposes such as storing of the electric power generated by the power generation unit 111. The electric power generated by the power generation unit 111 is stored in the power storage unit 112, and used as electric power for activating the communication unit 13.

Other than various secondary batteries such as a lithium-ion secondary battery, the power storage unit 112 includes an electric double layer capacitor, a lithium ion capacitor, a polyacenic semiconductor (PAS) capacitor, a Nanogate capacitor ("Nanogate" is a registered trademark of Nanogate Aktiengesellschaft), a ceramic capacitor, a film capacitor, an aluminum electrolytic capacitor, and a tantalum capacitor. Depending on purposes, these power storage units 112 may be used in combination.

Depending on the electric power to be supplied from the power generation unit 111, the power control unit 113 is switched between a stand-by mode and an output mode in which the electric power is supplied to the communication unit 13 and the control unit 12. With this, when the power generation amount of the power generation unit 111 is equal to or larger than a predetermined amount, the individual signal can be transmitted.

The power control unit 113 is constituted, for example, by an integrated circuit (IC) formed of one or more elements. As examples of the IC to be used in the power control unit 113, there may be mentioned a switching element such as a transistor, a diode, a reset IC, a regulator IC, a logic IC, and various arithmetic circuits. A circuit configuration inside the IC can be changed as appropriate as long as the function of the power control unit 113 can be exerted. Further, although it is preferred that the power control unit 113 be configured to be capable of retaining and storing a mode after the switching, the power control unit 113 may be configured to be incapable of retaining and storing that state due to reset or the like.

Further, the electric power generated by the power generation unit 111 may be supplied as appropriate to the power control unit 113 after its voltage is stepped up or stepped down.

The control unit 12 controls the transmission via the communication unit 13, and includes a processor and a memory. The control unit 12 of this embodiment can be configured as an MCU (Micro Control Unit).

The processor to be used in the control unit 12 controls a communication circuit. As examples of this processor, there may be mentioned an MPU (Micro Processing Unit) and a CPU (Central Processing Unit). The MPU is more preferred as the processor from viewpoints of the throughput of the communication unit 13 and requirements for downsizing of the transmission apparatus 1.

The communication unit 13 uses the electric power supplied from the power supply unit 11, and transmits the individual signal including the individual-identification information item such as the individual identifier.

The individual signal of this embodiment may include an information item of an amount of the power generated depending on the surrounding environment. The information item of the power generation amount may include a transmission pattern or a reception pattern of the individual signal based on the amount of the power generated depending on the surrounding environment, or may include a numerical value of the power generation amount. The individual signal may further include an information item of a type of the power generation. Examples of the information item of the type of the power generation include an information item indicating whether a source of the power generation performed by the communication unit 13 is one of the light, the temperature difference, and the radio waves, or a combination thereof.

Typically, as the individual identifier, the individual identifier that is specific to the transmission apparatus 1 and is assigned thereto in advance is used. With this, the individual identifier and the livestock animal to which the transmission apparatus 1 is attached correspond one by one to each other, and the livestock animal can be identified. Further, as long as the livestock animal can be identified, the individual identifier may be an identifier that is assigned each time.

The communication unit 13 includes a communication circuit and an antenna for performing communication, for example, with the relay apparatus 2.

The communication to be performed by the communication circuit of the communication unit 13 may be wireless or may be wired. Further, a wireless module may be single, may be of various types, or may be a composite module including the various types. The wireless communication may be of a communication type utilizing electromagnetic waves or infrared rays, may be communication utilizing an electric field, or may be communication utilizing acoustic waves. As examples of a specific method therefor, there may be mentioned communication methods utilizing a band of several hundreds MHz (megahertz) to several GHz (gigahertz), such as "Wi-Fi (registered trademark)," "ZigBee (registered trademark)," "Bluetooth (registered trademark)," "Bluetooth Low Energy," "ANT (registered trademark)," "ANT+ (registered trademark)," and "EnOcean (registered trademark)." Proximity wireless communication such as NFC (Near Field Communication) also may be employed.

The proximity wireless communication refers to near-field wireless communication at, for example, approximately several cm to 1 m. As examples of the proximity wireless communication other than the NFC, there may be mentioned communication methods such as a communication method using an RFID (Radio Frequency Identifier) according, for example, to ISO/IEC 14443, and a communication method such as infrared communication.

(Reception Apparatus)

The relay apparatus 2 includes a control unit 21, a first communication unit 22, and a second communication unit 23.

The control unit 21 controls the first communication unit 22 and the second communication unit 23, and is constituted, for example, by the MPU or the CPU. A processor to be used in the control unit 21 controls communication circuits. Examples of the processor include the MPU and the CPU.

A memory that stores device information items for identifying the relay apparatus 2 is connected to the processor in the control unit 21. The processor and the memory may constitute the MCU (Micro Control Unit).

Further, the memory for the control unit 21 may store a device-identification information item that enables identification of the relay apparatus 2. The device-identification information item may include the identifier of the relay apparatus 2. In addition, the individual identifier may be an identifier specific to the relay apparatus 2, or may be an identifier set by the user.

The first communication unit 22 is configured to be capable of communicating with the communication unit 13 of the transmission apparatus 1. The first communication unit 22 includes a communication circuit and an antenna that are compatible with a communication method for the communication with the communication unit 13. Examples of this communication method include the communication method utilizing electromagnetic waves or infrared rays, the communication method utilizing an electric field, the wireless communication method utilizing acoustic waves, and the wired communication methods.

The second communication unit 23 is configured to be capable of communicating with the server apparatus 3.

Examples of a communication method applicable to the second communication unit 23 include communication methods that enable establishment of connection to the network N, more specifically, communication methods using a wireless LAN (according, for example, to IEEE802.11) such as Wi-Fi (registered trademark), or using a 3G or a 4G network for mobile communication.

When the communication methods such as WiFi are applied to the second communication unit 23, the second communication unit 23 can be connected to the network N via a predetermined access point.

Note that, the second communication unit 23 may be configured as a gateway for establishing the connection to the network N. In this case, the second communication unit 23 may be configured as a separate communication apparatus that is connected in a wired or wireless manner to the relay apparatus 2 as a main unit. This communication apparatus may be a communication apparatus for establishing the connection to the network, or may be an information processing apparatus capable of connecting to the network. Alternatively, the relay apparatus 2 may include an interface for establishing the connection to the network, which is connected to the relay apparatus 2 as the main unit via, for example, a USB (Universal Serial Bus) terminal. At least a part of the second communication unit 23 may be constituted by this interface.

(Server Apparatus)

The server apparatus 3 includes a control unit 31, a storage unit 32, and a communication unit 33.

The control unit 31 is a processor constituted by a CPU, and collectively control the units in the server apparatus 3. The control unit 31 executes predetermined processes, for example, in accordance with control programs stored in the storage unit 32.

The storage unit 32 includes a ROM (Read Only Memory) in which the programs to be executed by the control unit 31 are stored, and a RAM (Random Access Memory) to be used, for example, as a working memory at the time when the control unit 31 executes the processes. The storage unit 32 may further include an HDD (Hard Disk Drive) and a nonvolatile memory such as a flash memory (SSD; Solid State Drive).

The communication unit 33 is configured to be capable of being connected to the network N, and communicating with the terminal apparatus 4. The communication unit 33 can be connected to the network N via hardware network interfaces for the wireless LAN (according, for example, to IEEE802.11) such as Wi-Fi (registered trademark), and a wired LAN.

The server apparatus 3 may include, in addition to these configurations, configurations such as a display unit and an input operation unit as appropriate.

(Terminal Apparatus)

The terminal apparatus 4 includes a control unit 41, a storage unit 42, a communication unit 43, a display unit 44, and an input operation unit 45. The terminal apparatus 4 further includes a casing (not shown) that accommodates the control unit 41, the storage unit 42, the first communication unit 43, the communication unit 43, the display unit 44, and the input operation unit 45. The casing is configured, for example, to be capable of being carried by the user.

The control unit 41 is a processor constituted by a CPU, and collectively controls the units in the terminal apparatus 4. The control unit 41 executes predetermined processes in accordance with control programs stored in the storage unit 42.

The storage unit 42 includes a ROM, a RAM, and a nonvolatile memory.

The communication unit 43 is configured to be capable of being connected to the network N, and communicating with the server apparatus 3. Specifically, the communication unit 43 can be connected to the network N by using the wireless LAN (according, for example, to IEEE802.11) such as Wi-Fi (registered trademark), or by using the 3G or the 4G network for mobile communication. With this, the communication unit 43 can communicate with the server apparatus 3.

The display unit 44 is a display device such as an LCD (Liquid Crystal Display) and an organic EL (Electroluminescence) panel. The display unit 44 may include, in addition to the display device, a D/A conversion circuit.

The input operation unit 45 is, for example, a touchscreen, a keyboard, a pointing device such as a mouse, or other input apparatuses. When the input operation unit 45 is the touchscreen, the touchscreen can be integrated with the display unit 44.

Note that, the terminal apparatus 4 may include, in addition to these configurations, a battery, a camera, a microphone, and a speaker (none of which is shown).

[Functional Configuration of Livestock Management System]

Figure 4:
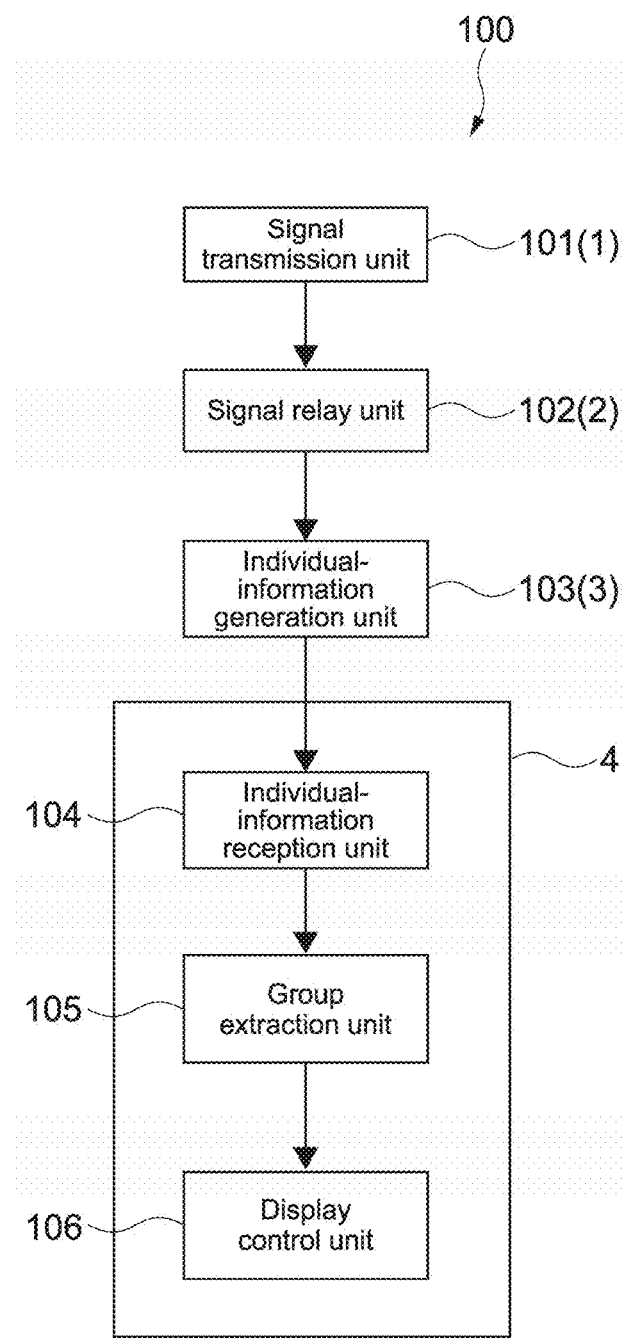
FIG. 4 A block diagram showing a functional configuration of the livestock management system, and a procedure of processes therein.

FIG. 4 is a block diagram showing a functional configuration of the livestock management system 100, and a procedure of processes therein.

As shown in FIG. 4, the livestock management system 100 includes a signal transmission unit 101, a signal relay unit 102, an individual-information generation unit 103, an individual-information reception unit 104, a group extraction unit 105, and a display control unit 106.

Among these configurations, in this embodiment, the signal transmission unit 101 corresponds to the communication unit 13 of the transmission apparatus 1.

The signal relay unit 102 corresponds to the first communication unit 22 and the second communication unit 23 of the relay apparatus 2.

The individual-information generation unit 103 corresponds to the control unit 31 of the server apparatus 3.

The individual-information reception unit 104 corresponds to the communication unit 43 of the terminal apparatus 4.

The group extraction unit 105 corresponds to the control unit 41 of the terminal apparatus 4.

The display control unit 106 corresponds to the control unit 41 of the terminal apparatus 4, and controls images to be displayed on the display unit 44.

The signal transmission unit 101 transmits the individual signal from the transmission apparatus 1 attached to each of the plurality of livestock animals (individuals). As described above, the individual signal may include the individual-identification information item such as the individual identifier that enables identification of the livestock animal. The individual signal may also include the information item of the power generation amount of the power generation unit 111, and the attribute of the transmission apparatus 1. Further, the individual signal may include an information item of a position of the transmission apparatus 1.

The signal relay unit 102 receives the transmitted individual signal, and transmits the information items based on the individual signal to the server apparatus 3.

The information items based on the individual signal at least include the information items included in the individual signal. Further, these information items may include the information items relating to the individual signal, which can be added by the relay apparatus 2. There may be included an information item of a signal intensity at the time when the individual signal is received, and the device-identification information item of the relay apparatus 2.

Further, the signal relay unit 102 may correspond to the plurality of relay apparatuses 2. In this case, the plurality of relay apparatuses 2 may each receive the individual signal transmitted from the same transmission apparatus 1, and may each transmit the signal to the server apparatus 3.

The individual signal and the like, which are transmitted by the signal relay unit 102, are received by the communication unit 33 of the server apparatus 3.

On the basis of the individual signal transmitted from the transmission apparatus 1 attached to each of the plurality of livestock animals (individuals), the individual-information generation unit 103 generates individual information items of each of the livestock animals. The individual information items include the respective position information items of the plurality of livestock animals (individuals). The position information items are information items that enable specification of respective positions of the livestock animals in the map image, such as information items of a latitude and a longitude of each of the livestock animals, and information items of coordinates with respect to a predetermined point in the map image as an origin.

In this embodiment, the individual-information generation unit 103 is capable of generating the position information items on the basis of the information items of the signal intensities at the time when the individual signals are received by the one or more relay apparatuses 2. As known, the signal intensity correlates with a communication distance. Thus, on the basis of the signal intensity, a distance between the transmission apparatus 1 and the relay apparatus 2 at the time of the transmission can be estimated. In addition, when the plurality of relay apparatuses 2 are used with their positions being registered in advance, a relative position of the transmission apparatus 1 with respect to these relay apparatuses 2 can be calculated in a manner of triangulation.

Alternatively, when the individual signal includes the information item of the position of the transmission apparatus 1, the individual-information generation unit 103 may generate, on the basis of this position information item, a position information item of corresponding one of the plurality of livestock animals.

Further, the individual information items may include information items of each of the livestock animals, such as the respective individual-identification information items of the livestock animals, attribute information items of respective attributes of the livestock animals, condition information items of respective behaviors and respective health conditions of the livestock animals, and group information items of groups to which the livestock animals respectively belong. The attribute information items, the group information items, and the like may be associated, for example, with the individual-identification information items of the livestock animals, and stored in the storage unit 32 of the server apparatus 3.

Further, when the power generation amount of the power generation unit 111 varies in accordance with the behavior or the health condition of the livestock animal, the condition information item can be generated on the basis of the information item of the power generation amount of the power generation unit 111. Specifically, when the power generation unit 111 includes a vibration power generator, the individual-information generation unit 103 can estimate an activity amount of the livestock animal on the basis of the power generation amount, and generate individual information items including an information item of the activity amount as the condition information item. Further, when the power generation unit 111 includes the thermoelectric conversion element, the individual-information generation unit 103 can estimate a body temperature of the livestock animal on the basis of the information item of the power generation amount, and on the basis of an information item of an ambient temperature, and generate individual information items including an information item of the body temperature of the livestock animal as the condition information item.

The generated individual information items are transmitted by the communication unit 33 of the server apparatus 3, and received by the terminal apparatus 4.

The individual-information reception unit 104 receives the individual information items including the respective position information items of the plurality of livestock animals (individuals) based on the individual signals transmitted from the transmission apparatuses 1 attached respectively to the plurality of livestock animals.

The group extraction unit 105 extracts, on the basis of the individual information items and from the plurality of livestock animals (individuals), a plurality of group constituent individuals belonging to the group.

In this embodiment, the group extraction unit 105 is capable of extracting, from the plurality of individuals, a plurality of livestock animals (individuals) that have been determined to be in an aggregated state such as a cluster state as the plurality of group constituent individuals. Specifically, when a distance between adjacent ones of the individuals based on the position information items of the plurality of individuals is equal to or shorter than a predetermined inter-individual distance, the group extraction unit 105 may determine that the adjacent ones of the individuals are in the aggregated state. In this way, the livestock animals in the aggregated state can be easily extracted as a group.

In addition, the group extraction unit 105 is capable of specifying a plurality of peripheral constituent individuals on the basis of the above-mentioned position information items of the plurality of group constituent individuals. With this, the display control unit 106 described below can easily perform control of displaying the group indication on the basis of a distribution of the position information items of these peripheral constituent individuals. A method of specifying the peripheral constituent individuals is not particularly limited. For example, the group extraction unit 105 is capable of specifying the peripheral constituent individuals by mapping the positions of the livestock animals on the basis of the position information items, for example, into a binarized image corresponding to the map image, and applying, for example, a technology of contour tracing.

Alternatively, when the individual information items include the group information items of the groups to which the individuals respectively belong, the group extraction unit 105 can extract the plurality of group constituent individuals on the basis of these group information items. With this, costs of processes in the terminal apparatus 4 can be reduced. Further, when one of livestock animals in a group is separated from other ones, this separated one livestock animal can be extracted (for details, refer to Modification 2-2 of a second embodiment).

On the basis of the individual information items of each of the plurality of group constituent individuals, and on the basis of the distribution of the position information items of the plurality of peripheral constituent individuals that form a periphery of a group among the plurality of group constituent individuals, the display control unit 106 causes the display unit 44 to display the shape of the region occupied by the group as the group indication in the map image. For example, the display control unit 106 generates an image data item by superimposing the group indication on the map-image data item, transmits this image data item to the display unit 44, and causes the display unit 44 to display this image data item.

The map image to be used in this case is a map image in which regions where livestock animals stay (refer to the regions R11 and R12 in FIG. 2) can be displayed. Examples of the map image include a map image adaptable, for example, to an entire region of the stockbreeding facility (refer to the region R10 in FIG. 2). Typically, in the map image to be displayed, regions where the group constituent individuals being processing targets stay are displayed on an enlarged scale. In addition, the map image may be downloaded via the network N from an external server that provides map data items, or may be stored in the server apparatus 3 in advance and downloaded therefrom via the terminal apparatus 4. Alternatively, the map image may be stored in the storage unit 42 of the terminal apparatus 4. Still alternatively, the map image may be maps such as a terrain map and a topographic map, and captured images such as an aerial photograph.

Various methods of displaying the group indication can be employed.

For example, the display control unit 106 may display, as the group indication, a boundary line formed on the basis of the distribution of the position information items of the plurality of peripheral constituent individuals. With this, the shape of the region occupied by the group can be definitely displayed in the map image.

This boundary line may be a polygonal outline having vertices corresponding to the positions of the peripheral constituent individuals, or may be a closed curve formed of curves such as a Bezier curve that gently connects the positions of the peripheral constituent individuals. Alternatively, the boundary line may be an elliptical outline having a shape similar to the distribution of the peripheral constituent individuals. Still alternatively, the boundary line may be, for example, outlines similar to graphics formed of the polygon or the closed curve, or may be, for example, boundary lines expanded by a predetermined width, for example, from the outline of the polygon, the closed curve, or the elliptical outline.

The boundary lines are shown as arbitrary lines such as a broken line and a solid line.

Alternatively, the display control unit 106 may display, as the group indication, a graphic formed on the basis of the distribution of the position information items of the plurality of peripheral constituent individuals. This graphic may be, for example, a polygon having the vertices corresponding to the positions of the peripheral constituent individuals, a graphic formed of the closed curve, or an ellipse. As long as these graphics are displayed in a manner that these graphics can be distinguished from regions out of the regions occupied by these graphics, entireties of these graphics may be displayed, for example, in predetermined colors or patterns.

Further, the display control unit 106 may cause the display unit 44 to display, in the map image, an individual-number indication that indicates the number of the plurality of group constituent individuals included in the group. By indicating the number of the individuals, even without displaying the distribution of the individual livestock animals, a size of the group, and an approximate distribution density of the group constituent individuals, and the like can be grasped.

This individual-number indication may be an indication of the number itself of the group constituent individuals, or may include, in addition to the indication of the number, or instead of the indication of the number, an icon having a size corresponding to the number of the plurality of group constituent individuals. Further, this icon may be, for example, an icon schematically indicating a livestock animal, or may be graphics such as a circle and a quadrangle. By indicating the number of the group constituent individuals with use of the icon, the group size and the like can be visually and intuitively grasped.

A position at which the individual-number indication is displayed is not particularly limited. The individual-number indication may be displayed inside the group indication, or outside and near the group indication. Further, when the individual-number indication is displayed inside the group indication, the individual-number indication may be displayed at a position indicating a center of the group.

[Operation Example]

Figure 5:
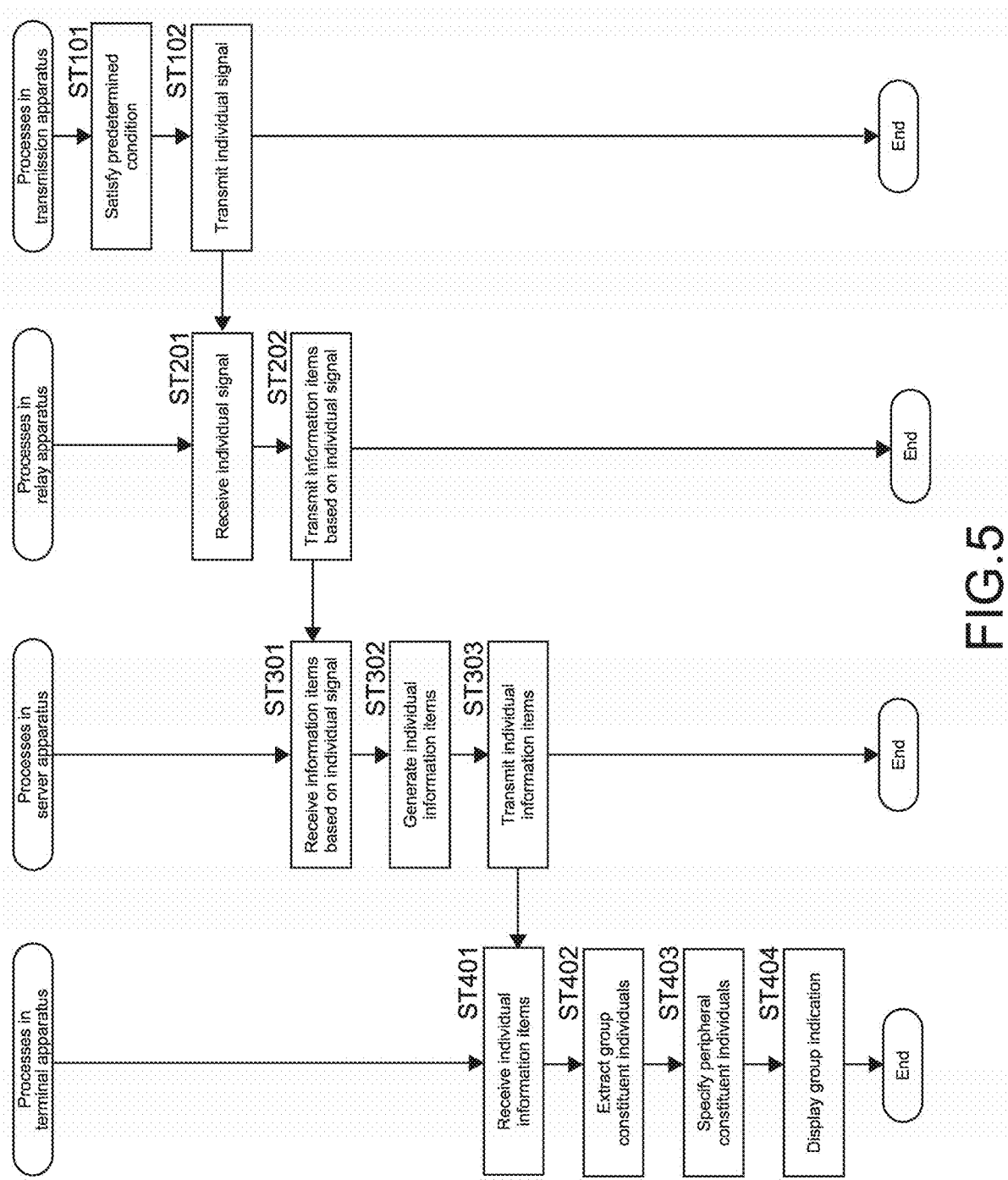
FIG. 5 A flowchart showing an operation example of the livestock management system.

FIG. 5 is a flowchart showing an operation example of the livestock management system 100.

This operation example is described by way of an example in which individual signals transmitted from five transmission apparatuses 1 attached respectively to five livestock animals are received by the two relay apparatuses 2 and the single server apparatus 3, and in which the server apparatus 3 calculates positions of the livestock animals from information items of signal intensities.

Note that, in FIG. 5, processes of ST101 to ST102 are executed by the transmission apparatuses 1, processes of ST201 to ST202 are executed by the relay apparatuses 2, processes of ST301 to ST303 are executed by the server apparatus 3, and processes of ST401 to ST404 are executed by the terminal apparatus 4.

Further, in FIG. 5, operations by all the five transmission apparatuses 1 and all the two relay apparatuses 2 are not shown, and operations by one of the transmission apparatuses 1 and one of the relay apparatuses 2 are representatively shown.

First, when a predetermined condition is satisfied (ST101), the transmission apparatus 1 (signal transmission unit 101) transmits an individual signal (ST102). The individual signal includes the individual-identification information item that enables identification of the livestock animal, such as an identifier. Further, as an example of the predetermined condition in this case, there may be mentioned a condition that the power generation amount of the power generation unit 111 has been equal to or larger than a predetermined power generation amount. As another example, there may be mentioned a condition that a signal for requesting the individual signal has been received, for example, from the relay apparatus 2 or the terminal apparatus 4.

The signal relay unit 102 of the relay apparatus 2 receives the transmitted individual signal (ST201), and transmits information items based on the individual signal (ST202). In this operation example, the signal relay unit 102 transmits, as the information items based on the individual signal, the individual-identification information item included in the individual signal, the information item of the signal intensity at the time when the individual signal is received, and the device-identification information item of the relay apparatus 2 that has received the individual signal.

The server apparatus 3 receives the information items based on the individual information items, which are transmitted from the relay apparatus 2 (ST301). On the basis of the individual signal transmitted from the transmission apparatus 1 attached to each of the plurality of livestock animals, the individual-information generation unit 103 generates individual information items of each of the livestock animals (ST302). In this operation example, the individual-information generation unit 103 is capable of generating a position information item of the livestock animal on the basis of the information item of the signal intensity at the time when the individual signal is received by the relay apparatus 2, and on the basis of a position information item of the relay apparatus 2.

Figures 6, 7:
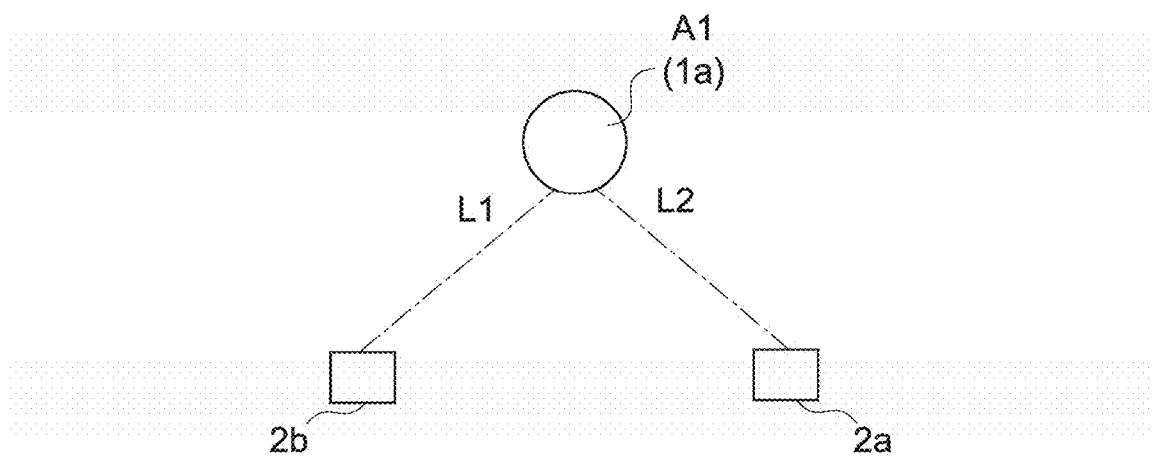
FIG. 6 A diagram showing a method of generating a position information item of each livestock animal in the operation example shown in FIG. 5.
FIG. 7 A view showing an example of a table prepared by an individual-information generation unit shown in FIG. 4, the table showing correspondences between individual-identification information items, signal intensities, device-identification information items and calculated position information items of reception apparatuses.

FIG. 6 is a diagram showing a method of generating the position information item of each of the livestock animals in this operation example. In FIG. 6, for the sake of convenience of description, the transmission apparatus 1a attached to the one livestock animal A1, and the two relay apparatuses 2a and 2b that receive the individual signal from the transmission apparatus 1a are shown.

As described above, the signal intensity and the communication distance correlate with each other. Thus, for example, when the relay apparatuses 2a and 2b respectively acquire information items of signal intensities of the individual signal from the transmission apparatus 1a attached to the livestock animal A1, the individual-information generation unit 103 can calculate distances L1 and L2 between the transmission apparatus 1 and the relay apparatuses 2a and 2b, respectively. Further, when position information items (such as information items of latitudes and longitudes) of the relay apparatuses 2a and 2b are registered, for example, with livestock registration application, and stored in the storage unit 32 in advance, the individual-information generation unit 103 can acquire positions of the relay apparatuses 2a and 2b from the device-identification information items of the relay apparatuses 2a and 2b, which are included in the information items based on the individual signal. In this way, the individual-information generation unit 103 can calculate the position of the transmission apparatus 1a, that is, the position of the livestock animal A1 from the positions of the relay apparatuses 2a and 2b and the distances L1 and L2 in a manner of triangulation.

FIG. 7 is a view showing an example of a table generated by the individual-information generation unit 103, the table showing correspondences between the individual-identification information items, the signal intensities, the device-identification information items and the calculated position information items of the relay apparatuses 2a and 2b.

"Livestock Animal ID" shown in FIG. 7 indicates individual identifiers of the livestock animals as an example of the individual-identification information items. "Device A ID" indicates the device-identification information item of the relay apparatus 2a. "Signal Intensity A" indicates the signal intensities of the individual signal received by the relay apparatus 2a. Similarly, "Device B ID" indicates the device-identification information item of the relay apparatus 2a. Further, "Livestock Animal Position" shows an example of the position information items of the livestock animals, which are calculated as described above.

As shown in FIG. 7, on the basis of the signal intensities of the individual signals corresponding to the livestock animal IDs, and on the basis of the positions (latitudes and longitudes) acquired from the IDs of the relay apparatuses 2a and 2b, the individual-information generation unit 103 is capable of calculating the positions (latitudes and longitudes) of the livestock animals by the method described with reference to FIG. 6, and generating the individual information items including the livestock animal IDs and the information items of the calculated latitudes and longitudes.

Then, the communication unit 33 of the server apparatus 3 transmits the individual information items to the terminal apparatus 4 via the network N (ST303). The server apparatus 3 may transmit the individual information items in response to the requests from the terminal apparatus 4, or may transmit the individual information items in a predetermined cycle.

Next, the individual-information reception unit 104 of the terminal apparatus 4 receives the individual information items (ST401). In this operation example, the individual-information reception unit 104 receives, as the individual information items, the ID and the information items of the calculated latitude and longitude of each of the livestock animals.

After that, on the basis of the individual information items, the group extraction unit 105 extracts, from the plurality of livestock animals, a plurality of group constituent individuals belonging to a group (ST402). In this operation example, the group extraction unit 105 is capable of extracting, from the plurality of individuals, a plurality of livestock animals that have been determined to be in an aggregated state as a plurality of aggregate-group constituent individuals. Specifically, when the distance between adjacent ones of the individuals based on the above-mentioned position information items of the plurality of individuals is equal to or shorter than the predetermined inter-individual distance, the group extraction unit 105 determines that the adjacent ones of the individuals are in the aggregated state.

Figure 8A:
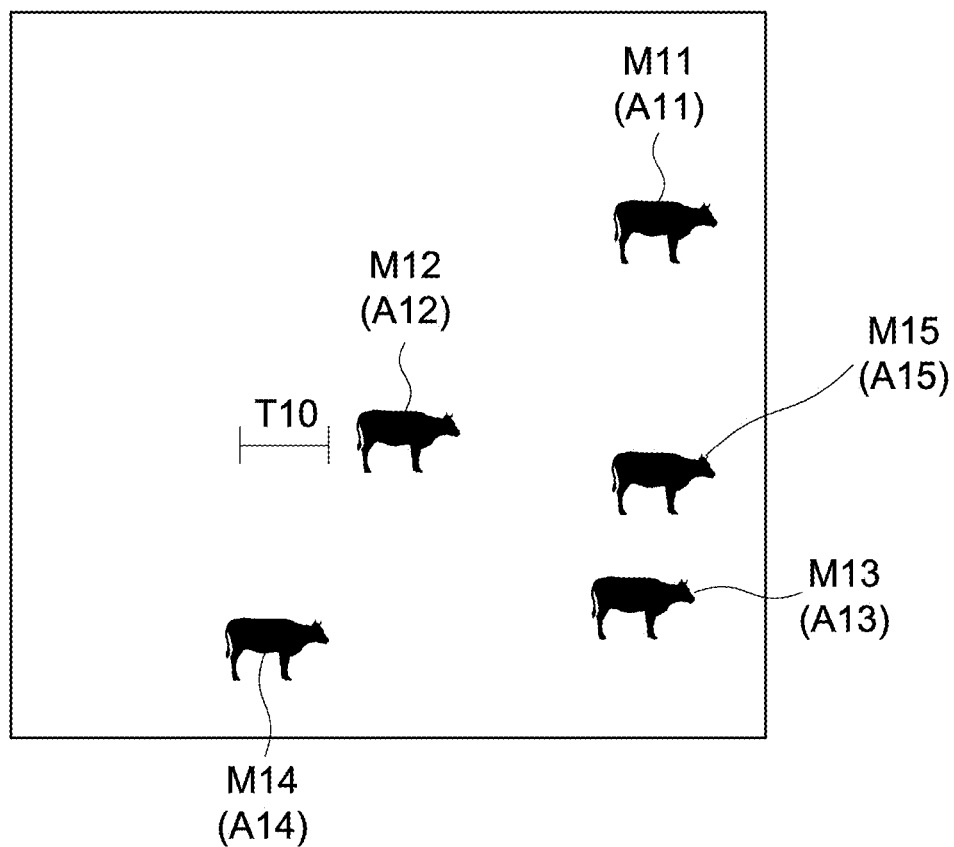
FIGS. 8A and 8B Views showing a method of determining an aggregated state in the operation example shown in FIG. 5.
Figure 8B:
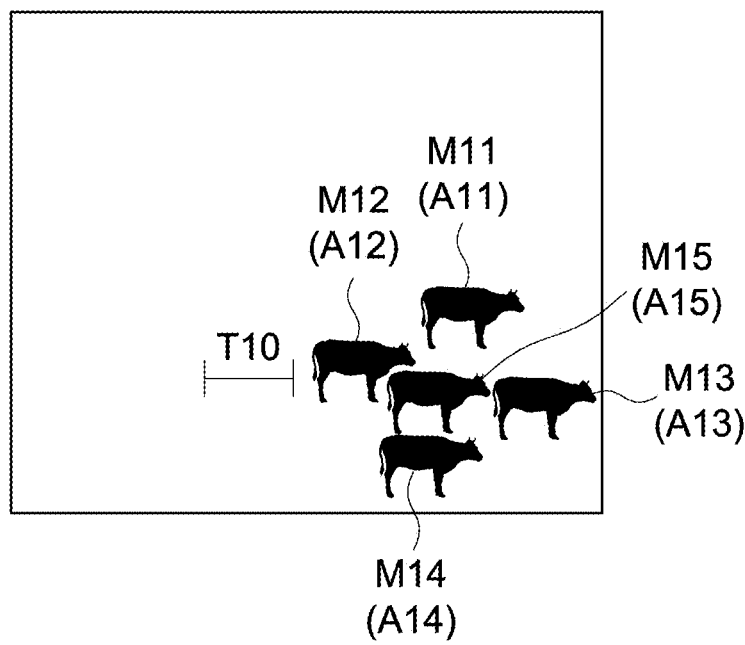

FIGS. 8A and 8B are views showing a method of determining the aggregated state in this operation example, each showing an image example of a map image in which icons M11 to M15 respectively indicating positions of livestock animals A11 to A15 are displayed. Specifically, FIG. 8A shows an example in which a determination of the aggregated state has not been made, and FIG. 8B shows an example in which the determination of the aggregated state has been made. A distance T shown in FIGS. 8A and 8B schematically indicates a predetermined inter-individual distance.

In the case shown in FIG. 8A, the livestock animals A11 to A15 are spaced apart from each other at a distance larger than the inter-individual distance T10. In such a case, none of the livestock animals A11 to A15 is determined to be in the aggregated state, and the group indication is not displayed. Thus, in this case, as an image showing a distribution of the livestock animals A11 to A15, the image shown in FIG. 8A can be displayed on the terminal apparatus 4.

Figure 10:
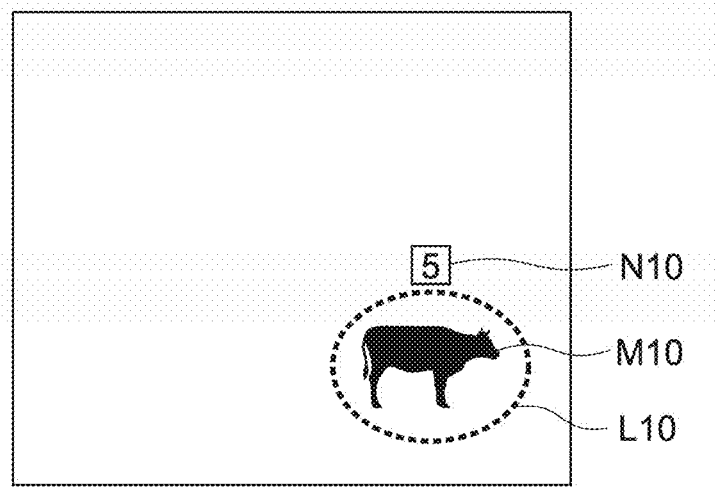
FIG. 10 An image example of a map image in which a group indication is displayed in the operation example shown in FIG. 5.

Meanwhile, in the case shown in FIG. 8B, the distances between the adjacent ones of the livestock animals A11 to A15 are each equal to or shorter than the inter-individual distance T10. In this case, all the livestock animals A11 to A15 are determined to be in the aggregated state, and the livestock animals A11 to A15 are extracted as the aggregate-group constituent individuals. In this case, the image shown in FIG. 8B is not actually displayed, and an image as shown in FIG. 10 can be displayed as described below. Note that, the images shown in FIGS. 8A and 8B may be displayed or need not necessarily be displayed on the terminal apparatus 4.

Next, on the basis of the position information items of the plurality of group constituent individuals, the group extraction unit 105 specifies a plurality of peripheral constituent individuals that form a periphery of the group among the plurality of group constituent individuals (ST403).

Figure 9:
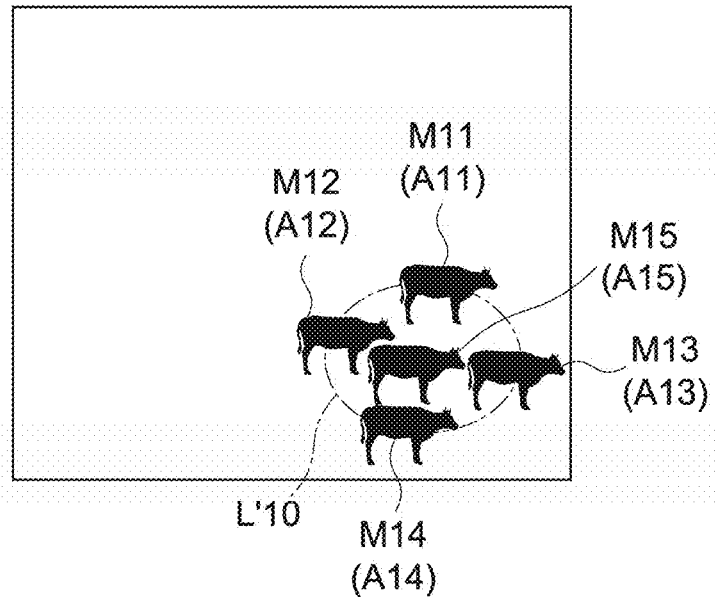
FIG. 9 A view showing a method of specifying peripheral constituent individuals in the operation example shown in FIG. 5.

FIG. 9 is a view showing a method of specifying the peripheral constituent individuals in this operation example by way of an example of specifying the peripheral constituent individuals with reference to the image shown in FIG.

8B. Note that, the image shown in FIG. 9 may be displayed or need not necessarily be displayed on the terminal apparatus 4.

As shown in FIG. 9, in this example, the livestock animals A11 to A14 (icons M11 to M14) forming the periphery of the group are specified as the peripheral constituent individuals. In FIG. 9, a dash-dotted line L'10 based on a distribution of the position information items of the peripheral constituent individuals, which is formed by connecting the positions of the peripheral constituent individuals, is shown.

Lastly, on the basis of the distribution of the position information items of the plurality of peripheral constituent individuals, the display control unit 106 causes the display unit 44 to display, as the group indication in the map image, a shape of a region occupied by the group (ST404). In this operation example, the display control unit 106 causes the display unit 44 to display, as the group indication, a boundary line formed on the basis of the distribution of the plurality of peripheral constituent individuals A11 to A14.

FIG. 10 shows an image example of a map image in which the group indication is displayed. The image shown in FIG. 10 can be displayed on the terminal apparatus 4.

In the example shown in FIG. 10, a boundary line L10 is displayed as the group indication. The boundary line L10 is shown as a broken-line ellipse being a shape most similar to the distribution of the peripheral constituent individuals.

Further, as shown in FIG. 10, the display control unit 106 may cause the display unit 44 to display, as the individual-number indications, a number N10 of the group constituent individuals, and an icon M10 having a size corresponding to the number of the plurality of group constituent individuals. With this, a size of the group can be intelligibly and simply displayed.

The icon M10 may be arranged at a center position of the region occupied by the group. This center position may be an average position calculated from position information items of the group constituent individuals A11 to A15, or may be, for example, a center of gravity of the region enclosed by the boundary line L10.

As described hereinabove, according to this embodiment, individuals that form a periphery of a group of, for example, livestock animals can be specified, and a shape of a region occupied by the group can be displayed on the basis of a distribution of position information items of the peripheral constituent individuals. Thus, the group of, for example, livestock animals can be intuitively displayed.

[Modifications of this Embodiment]

Now, modifications of this embodiment are described. Note that, configurations similar to those in the above-described embodiment are denoted by the same reference symbols, and description thereof is omitted.

(Modification 1-1: Modification of Extraction Method for Group)

In the above-described operation example, the group extraction unit 105 extracts, from the plurality of individuals, a plurality of livestock animals that have been determined to be in the aggregated state as a plurality of group constituent individuals. However, how the group extraction unit 105 performs extraction is not limited thereto.

For example, when the individual information items include group information items of groups to which the individuals respectively belong, the group extraction unit 105 may extract the plurality of group constituent individuals on the basis of these group information items. In this case, the group extraction unit 105 may specify the peripheral constituent individuals as appropriate, or need not necessarily specify the peripheral constituent individuals.

Note that, the group is not limited to the group in the aggregated state in the above-described example, and there may be set various other groups in accordance with management, such as a group to which individuals under similar feed management belong, and a group to which a cow and calves belong.

Figure 11:
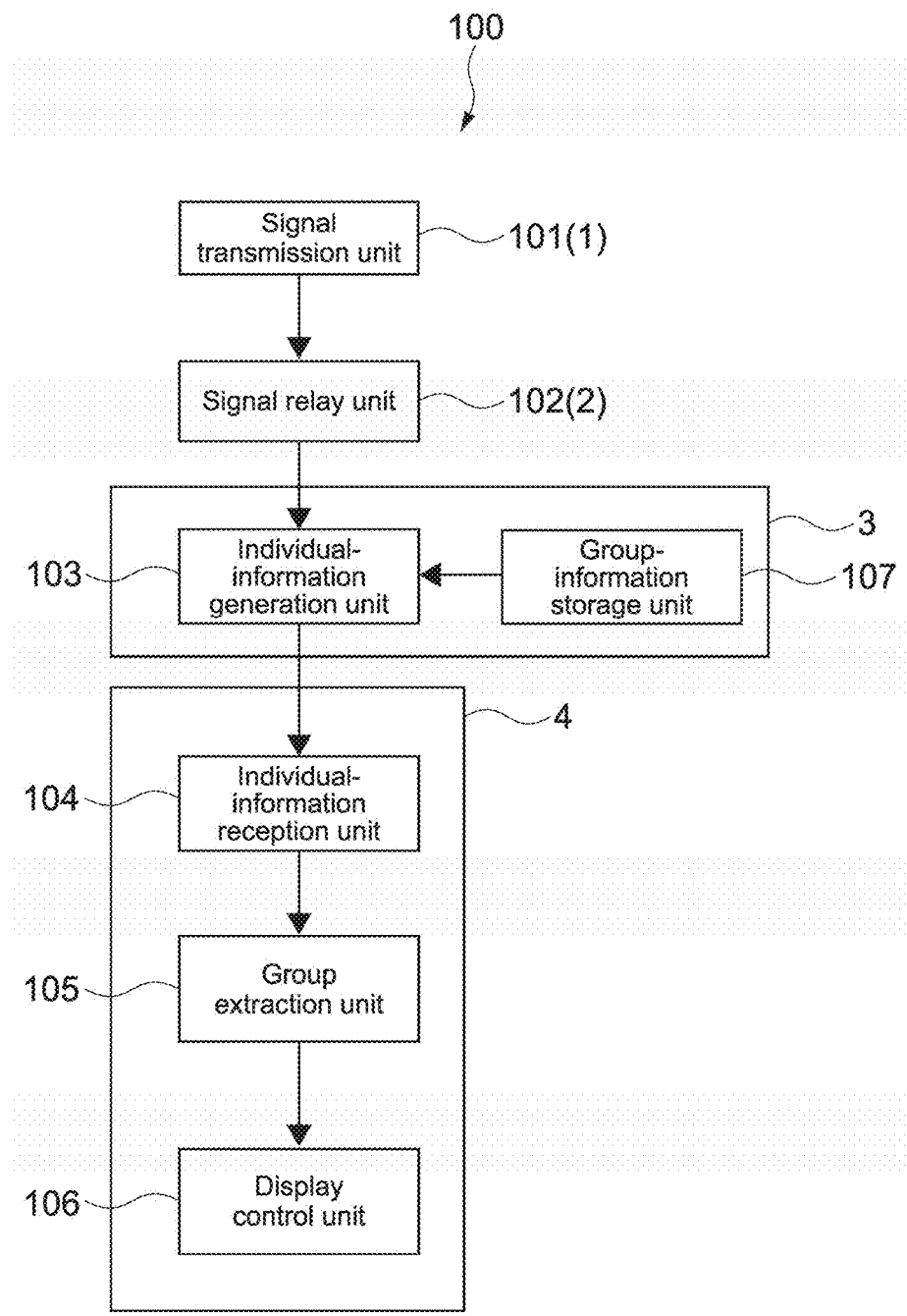
FIG. 11 A block diagram showing a functional configuration of a livestock management system 100 according to Modification 1-1, and a procedure of processes therein.

FIG. 11 is a block diagram showing a functional configuration of the livestock management system 100 according to Modification 1-1, and a procedure of processes therein.

As shown in FIG. 11, the livestock management system 100 includes the signal transmission unit 101, the signal relay unit 102, the individual-information generation unit 103, the individual-information reception unit 104, the group extraction unit 105, and the display control unit 106, and in addition, a group-information storage unit 107. The group-information storage unit 107 corresponds, for example, to the control unit 31 and the storage unit 32 of the server apparatus 3.

The group-information storage unit 107 associates with each other and stores the individual-identification information items included in the individual signal, and the group information items of the groups to which the individuals to be identified on the basis of the individual-identification information items belong.

FIG. 12 is a view showing an example of a table including the individual-identification information items and the group information items stored in the group-information storage unit 107.

As shown in FIG. 12, this table stores the group information items corresponding to the individual-identification information items (livestock animal IDs).

The individual-information generation unit 103 is capable of generating, with reference to the table, the individual information items including the group information items stored in association with the individual-identification information items of the individuals from which the individual signals are transmitted.

Note that, the group-information storage unit 107 may be configured as a single independent database, or may be configured as a part of a database including the attribute information items and other information items described below.

The group-information storage unit 107 is capable of storing the group information items, for example, when the user registers the groups of the livestock animals corresponding to the individual-identification information items via, for example, the terminal apparatus 4 having the livestock management application installed therein. Alternatively, as described in the operation example in the first embodiment, the group-information storage unit 107 may receive and store, as the group information items, the information items of the aggregate-group constituent individuals that have been determined to be in the aggregated state.

According to this modification, also when a user performs individual management of livestock animals on the basis of predetermined groups, group constituent individuals can be extracted on the basis of these groups.

(Modification 1-2: Modification of Method of Determining Aggregated State)

Further, as long as the state in which the individuals have aggregated can be determined, the method of determining the aggregated state with the group extraction unit 105 is not limited to the method in the above-described operation example.

For example, the group extraction unit 105 may extract a plurality of individuals distributed at a predetermined density or higher as the aggregate-group constituent individuals.

Alternatively, the group extraction unit 105 may extract a plurality of individuals distributed at a predetermined dispersion value or less as the aggregate-group constituent individuals.

Criteria for determining the aggregated state, such as the inter-individual distance, the density, and the dispersion value, may be set, for example, in response to input operations by the user. Alternatively, the criteria for determining the aggregated state may be automatically set on the basis of, for example, sizes of the stockbreeding facility and the pastoral regions, and the number of livestock animals to be managed. More specifically, when a pastoral region being a management target has a size larger than a predetermined size, the inter-individual distance to be used as the criterion for determining the aggregated state can be set larger than a default value. Alternatively, when the number of livestock animals being management targets is larger than a predetermined number, the inter-individual distance to be used as the criterion for determining the aggregated state can be set smaller than the default value. Still alternatively, the criteria for determining the aggregated state may be changed on the basis of a scale (magnification) of the map image. In this case, as the display scale of the map image becomes larger than that in an initial state, for example, the inter-individual distance at which the aggregated state is determined can be smaller than the default value. In these ways, on the basis of, for example, the size of the group of the livestock animals that the user manages, and the size of the stockbreeding facility, more appropriate criteria for determining the aggregated state can be set.

(Modification 1-3: Modification of Group Indication)

The method of displaying the group indication with the display control unit 106 is not limited to the method in the above-described operation example.

Figure 13A:
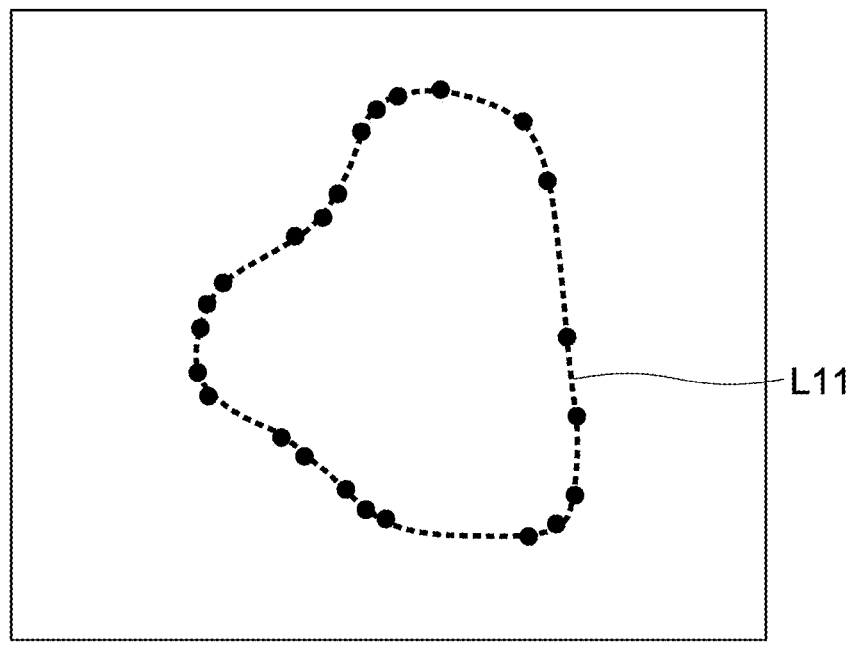
FIGS. 13A and 13B Views showing a method of generating group indications according to Modification 1-3.
Figure 13B:
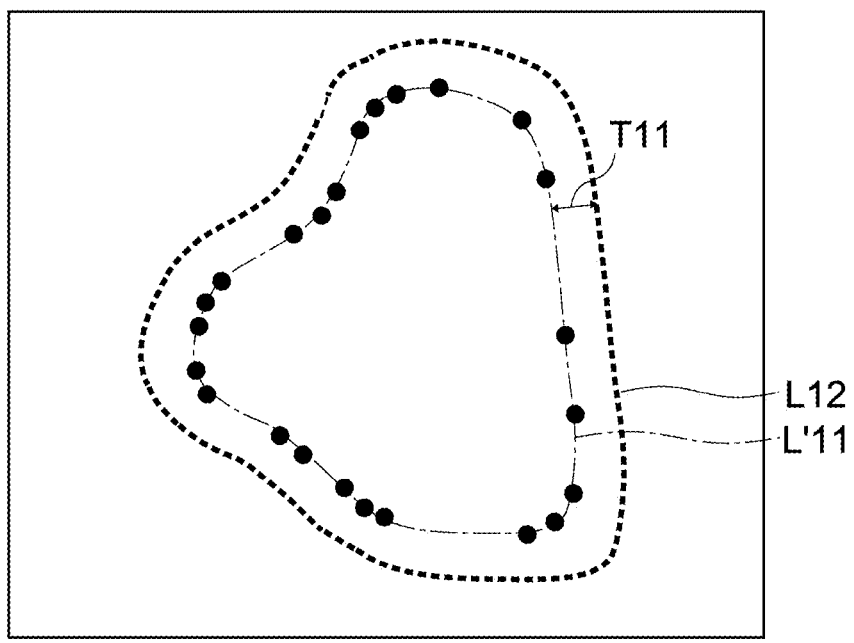

FIGS. 13A and 13B are views showing a method of generating group indications according to Modification 1-3 by way of an example in which a boundary line as the group indication is displayed in a map image. Note that, although a distribution of peripheral constituent individuals is indicated by solid circles in FIGS. 13A and 13B for the sake of convenience of description, the distribution of the peripheral constituent individuals need not necessarily be actually displayed.

A boundary line L11 shown in FIG. 13A is formed of the closed curve including curves such as a Bezier curve that mildly connects the positions of the peripheral constituent individuals. With this, even when the group constituent individuals are distributed in a complex shape, this shape can be more accurately expressed.

A boundary line L12 shown in FIG. 13B is formed by expanding a line L'11 based on the distribution of the peripheral constituent individuals by a predetermined width T11. A size of this width T11 is not particularly limited as long as a region occupied by a group can be accurately displayed. With this, even in such a case where the icons and the like are displayed at positions corresponding to the distributed peripheral constituent individuals, the boundary line and the icons and the like can be avoided overlapping with each other, and can be more intelligibly displayed.

Further, the livestock management system 100 includes a mode in which the group indication is displayed on the terminal apparatus 4, and a mode in which the group indication is not displayed thereon. The livestock management system 100 may be configured to be switchable therebetween, for example, in response to the input operations by the user. In the mode in which the group indication is displayed, for example, when the individuals are determined to be in the aggregated state, or when the group is registered in advance, the display control unit 106 displays the group indication. Meanwhile, in the mode in which the group indication is not displayed, the group constituent individuals are not extracted, and the distribution of the livestock animals as shown in FIG. 8A is displayed in the map image. With this, a livestock management system 100 capable of satisfying more diverse needs of users can be provided.

Further, the group extraction unit 105 may be configured to be capable of extracting different group constituent individuals on the basis of types of groups specified, for example, in response to the input operations by the user, and of switching group indications. With this, it is possible to adapt to such a case where the user manages individual livestock animals in the groups of the plurality of types.

(Modification 1-4: Modification of Auxiliary Indication)

In addition, the display control unit 106 may cause the display unit 44 to display individual information items of individuals among the plurality of group constituent individuals in response to an input operation to the group indication by the user.

Figure 14:
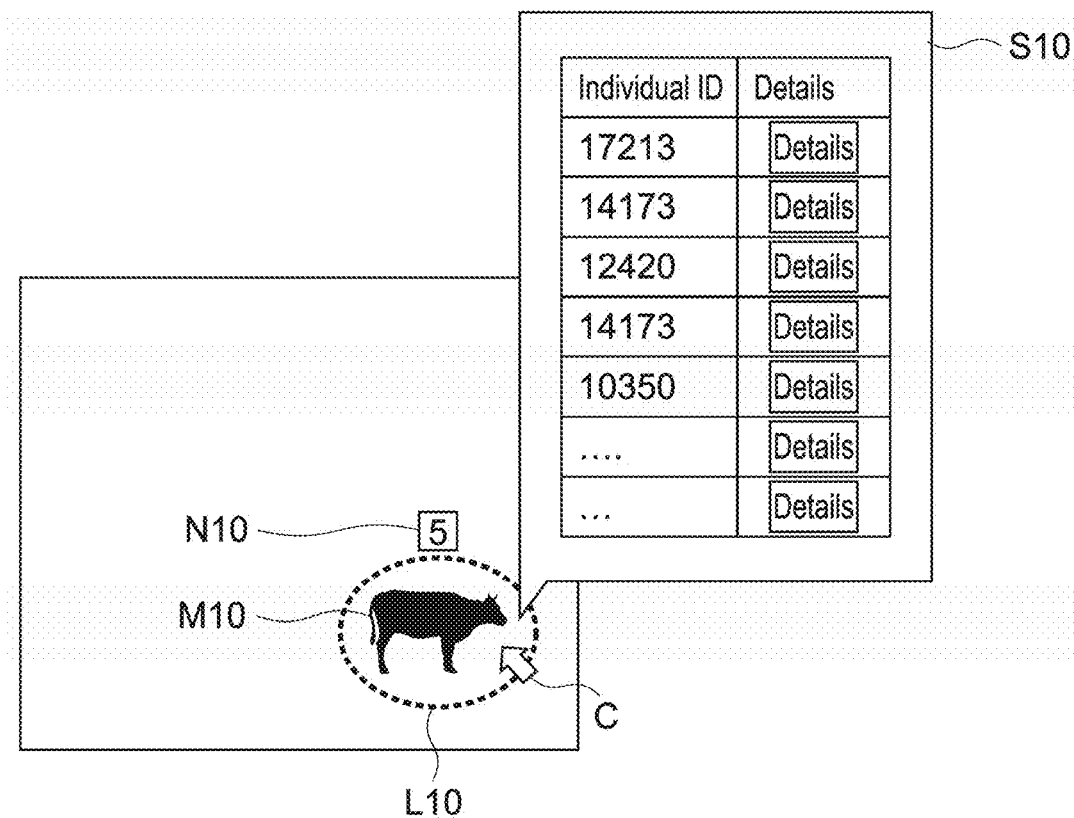
FIG. 14 A view showing a display method according to Modification 1-4.

FIG. 14 is a view showing a display method according to Modification 1-4 by way of an image example in which the group indication shown in FIG. 10 and some of the individual information items are displayed in a map image.

For example, the input operation unit 45 of the terminal apparatus 4 receives the input operation to the group indication by the user. Examples of this input operation may include touching, pinching-out, and clicking with respect to the displayed shape. The reference symbol C in FIG. 14 denotes a cursor.

When the input operation is received, the display control unit 106 causes the display unit 44 to display the individual information items of the individuals among the plurality of group constituent individuals. An indication S10 of the individual information items includes individual-identification information items (identifiers) of group constituent individuals listed as "Individual ID," and detail display buttons corresponding to those information items. When a predetermined input operation such as touching and clicking is performed with respect to the detail display button, the display control unit 106 may cause the display unit 44 to display additional individual information items of corresponding ones of the individuals. Specific examples of the individual information items other than the individual-identification information items include the attribute information items of respective attributes of the livestock animals, the condition information items of respective behaviors and respective health conditions of the livestock animals, the group information items of groups to which the livestock animals respectively belong, and the respective position information items of the individuals.

With this, detailed information items of a group that is roughly displayed as a shape of a region can be provided in response to requests from the user. As a result, convenience for the user can be increased.

(Modification 1-5: Modification of Individual Signal)

The individual signal in the above-described embodiment includes the individual-identification information item. However, the individual signal is not limited thereto.

For example, the individual signal need not necessarily include the individual-identification information item. In this case, when the relay apparatus 2 (signal relay unit 102)

associates the information item of a signal intensity at the time of receiving the individual signal with the individual signal, and then transmits the individual signal to the server apparatus 3, the individual-information generation unit 103 of the server apparatus 3 can generate the individual information items including the position information items. Then, the group extraction unit 105 and the display control unit 106 of the terminal apparatus 4 can execute the above-described processes on the basis of the position information items.

Also with this, a shape of a region occupied by a group of, for example, livestock animals can be displayed in a map image. Thus, the group can be intuitively displayed.

Alternatively, the individual signal may include the position information item.

For example, the transmission apparatus 1 may include a position information sensor such as a GPS sensor. With this, the transmission apparatus 1 can acquire a position information item of itself, and transmit the individual signal including this position information item.

In this case, the livestock management system 100 may be configured not to include the individual-information generation unit 103.

(Modification 1-6: Modification of System Configuration)

The livestock management system 100 described in the first embodiment includes the plurality of transmission apparatuses 1, the plurality of relay apparatuses 2, and the server apparatus 3, and the terminal apparatus 4. However, the livestock management system 100 is not limited to this configuration.

Figure 15:
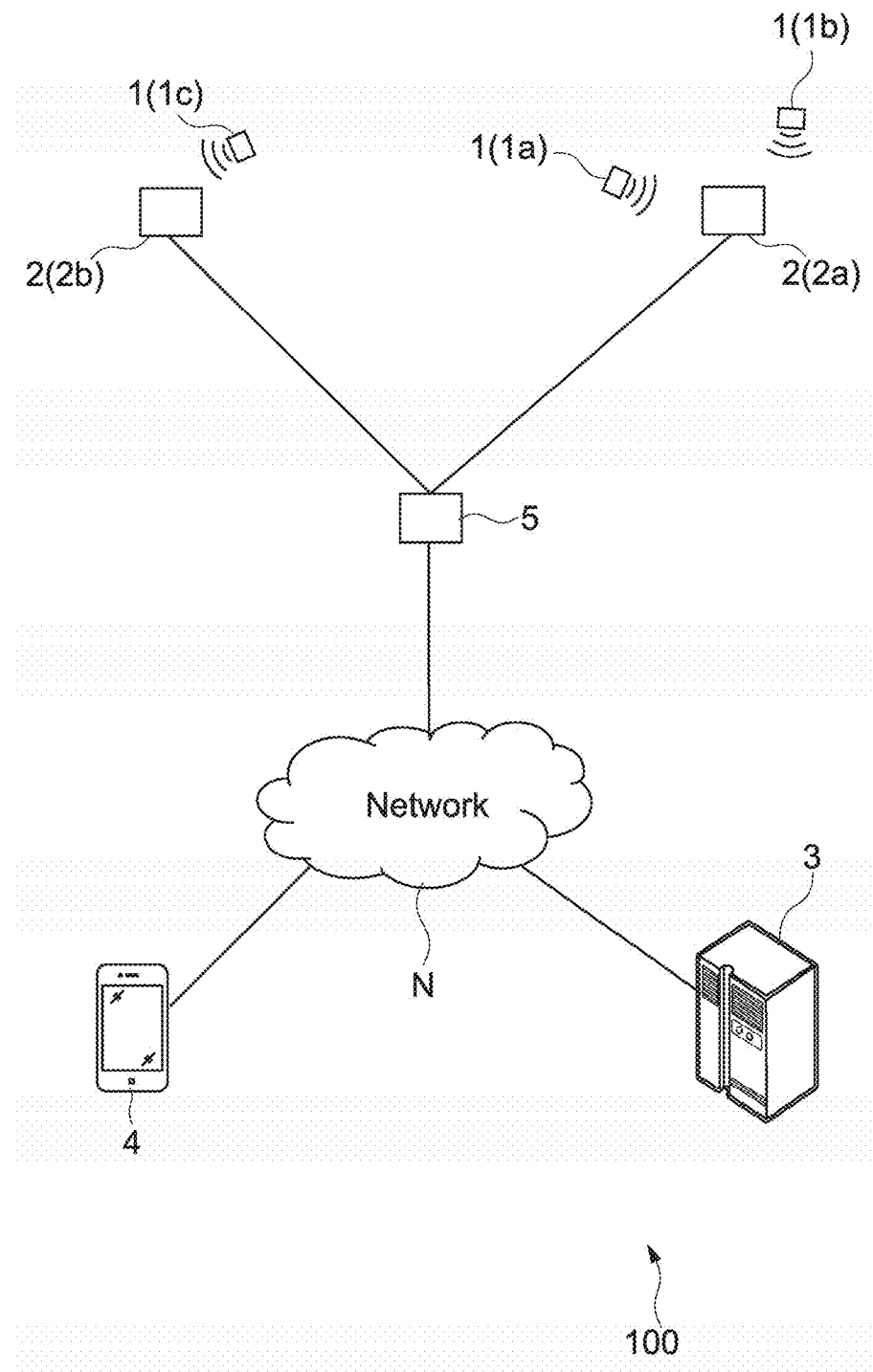
FIG. 15 A schematic view showing a schematic configuration of a livestock management system according to a configuration example of Modification 1-6.

FIG. 15 is a schematic view showing a schematic configuration of a livestock management system 100 according to a configuration example of Modification 1-6. In FIG. 15, for example, the livestock animals to which the transmission apparatuses 1a, 1b, and 1c are attached are not shown.

As shown in FIG. 15, the livestock management system 100 includes the plurality of transmission apparatuses 1, the plurality of relay apparatuses 2, the server apparatus 3, and the terminal apparatus 4, and in addition, a master relay apparatus 5.

The master relay apparatus 5 receives information items transmitted from the plurality of relay apparatuses 2, and transmits these information items to the server apparatus 3. What is called a gateway capable of communicating with the network N may be connected to the master relay apparatus 5. In this way, the master relay apparatus 5 is configured to be capable of establishing connection to the server apparatus 3 via the network N.

The master relay apparatus 5 may be a dedicated communication apparatus, or may be an information terminal different from the terminal apparatus 4.

Figure 16:
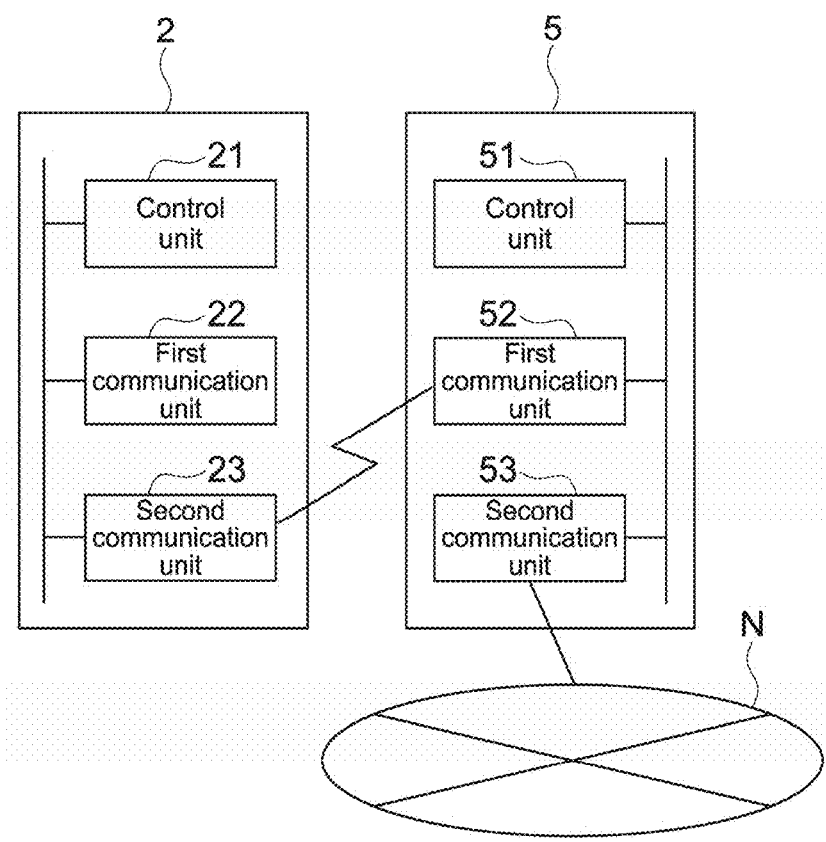
FIG. 16 A diagram showing hardware configurations of a reception apparatus and a master reception apparatus of a livestock management system according to Modification 1-6.

FIG. 16 is a diagram showing hardware configurations of the relay apparatus 2 and the master relay apparatus 5 according to Modification 1-6. Note that, in FIG. 16, for the sake of convenience of description, only one of the relay apparatuses 2 is shown.

The relay apparatus 2 includes the control unit 21, the first communication unit 22, and the second communication unit 23. In this modification, the second communication unit 23 is different in configuration from that described in the first embodiment.

The second communication unit 23 is configured to be capable of communicating with the master relay apparatus 5. The second communication unit 23 includes a communication circuit and an antenna that are compatible with a communication method for the communication with the master relay apparatus 5. Examples of this communication method include the communication method utilizing electromagnetic waves or infrared rays, the communication method utilizing an electric field, the wireless communication method utilizing acoustic waves, and the wired communication methods. Note that, the communication circuit and the antenna that the second communication unit 23 uses may be the same as those of the first communication unit 22.

The master relay apparatus 5 includes a control unit 51, a first communication unit 52, and a second communication unit 53.

The control unit 51 controls the first communication unit 52 and the second communication unit 53, and is constituted, for example, by a MPU or a CPU. A processor to be used in the control unit 51 controls communication circuits. Examples of the processor include the MPU and the CPU.

The first communication unit 52 is configured to be capable of communicating with the second communication unit 23 of the relay apparatus 2. The first communication unit 52 includes a communication circuit and an antenna that are compatible with the communication method for the communication with the second communication unit 23. Examples of this communication method include the communication method utilizing electromagnetic waves or infrared rays, the communication method utilizing an electric field, the wireless communication method utilizing acoustic waves, and the wired communication methods.

The second communication unit 53 is configured to be capable of communicating with the server apparatus 3 by being connected to the network N. Examples of a communication method applicable to the second communication unit 53 include communication methods that enable establishment of the connection to the network N, more specifically, communication methods using a wireless LAN (according, for example, to IEEE802.11) such as Wi-Fi (registered trademark), or using a 3G or a 4G network for mobile communication.

When the communication methods such as WiFi are applied to the second communication unit 53, the second communication unit 53 can be connected to the network N via a predetermined access point.

Note that, the second communication unit 53 may be configured as the gateway for establishing the connection to the network N. In this case, the second communication unit 53 may be configured as a separate communication apparatus (including information processing apparatus) that is connected in a wired or wireless manner to the master relay apparatus 5 as a main unit. Alternatively, the master relay apparatus 5 may include an interface for establishing the connection to the network, which is connected to the master relay apparatus 5 as the main unit via, for example, a USB terminal. At least a part of the second communication unit 53 may be constituted by this interface.

With such a configuration, structural simplification and power saving of each of the relay apparatuses 2 can be achieved. Thus, even when the relay apparatuses 2 are installed outdoors, high structural durability can be secured, and electric power can be easily supplied. In addition, the livestock management system 100 typically includes the only one master relay apparatus 5, and hence this master relay apparatus 5 can be installed at a site where, for example, a power supply environment is maintained. With this, good communication status can be maintained in an entirety of the system.

Further, as another configuration example, the server apparatus 3 may be omitted from the livestock management system 100, and the relay apparatuses 2 may transmit the information items based on the received individual signals directly to the terminal apparatus 4.

In this case, the terminal apparatus 4 may include the individual-information generation unit 103 that generates the individual information items including the position information items based, for example, on the information items of the signal intensities of the individual signals.

Alternatively, when the individual signals include the position information items as described in Modification 1-5, the terminal apparatus 4, which receives the information items based on these individual signals, may execute the processes with use of these position information items.

As still another configuration example, the relay apparatuses 2 and the server apparatus 3 may be omitted from the livestock management system 100, and the transmission apparatuses 1 may transmit the individual signals directly to the terminal apparatus 4. In this case, the individual signals include the position information items as described in Modification 1-5, and the terminal apparatus 4, which receives the information items based on these individual signals, can execute the processes with use of these position information items.

Further, as yet another configuration example, the livestock management system 100 may be constituted by at least one information processing apparatus (terminal apparatus 4 in the above-described examples) that includes at least the group extraction unit 105 and the display control unit 106. In other words, generally used apparatuses, and apparatuses that are not controlled by the information processing apparatus are applicable to the transmission apparatuses, the reception apparatuses, and the like.

(Modification 1-7: Modification of Hardware Configurations for Providing Functional Configuration)

In the above-described embodiment, the server apparatus 3 corresponds to the individual-information generation unit 103, and the terminal apparatus 4 corresponds to the group extraction unit 105 and the display control unit 106. However, correspondences between the units and the apparatuses are not limited thereto.

Figure 17:
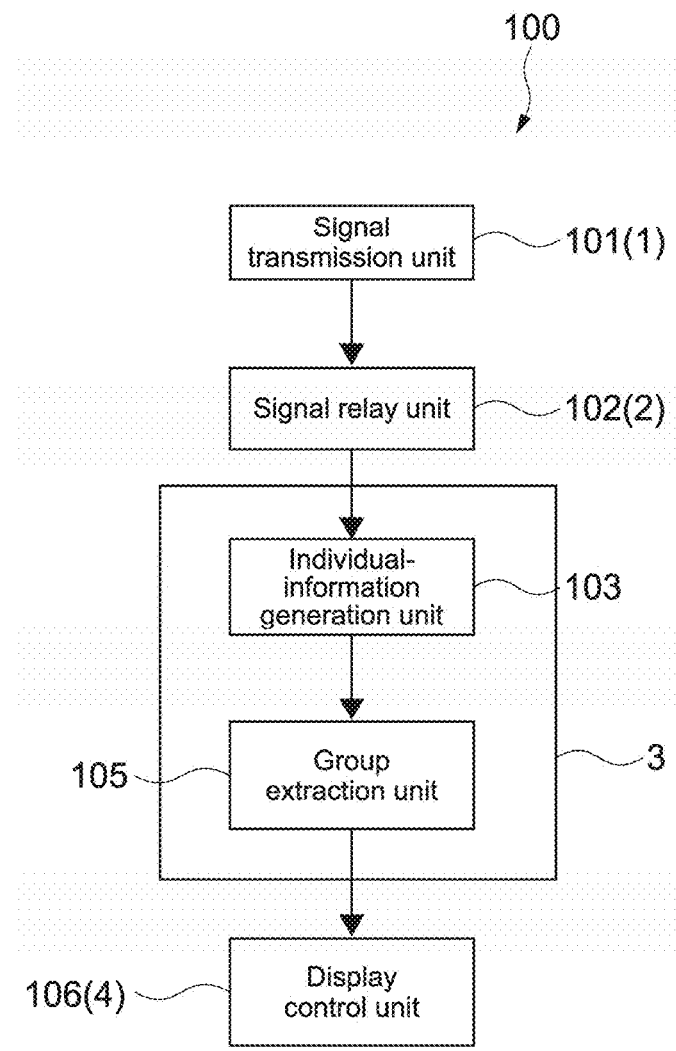
FIG. 17 A block diagram showing a functional configuration of a livestock management system according to a configuration example of Modification 1-7, and a procedure of processes therein.

For example, as shown in FIG. 17, the control unit 31 of the server apparatus 3 may correspond to the individual-information generation unit 103 and the group extraction unit 105, and the control unit 41 of the terminal apparatus 4 may correspond to the display control unit 106. In this configuration example, the livestock management system 100 does not include the individual-information reception unit 104, and the server apparatus 3 and the terminal apparatus 4 correspond to the "information processing apparatus."

Figure 18:
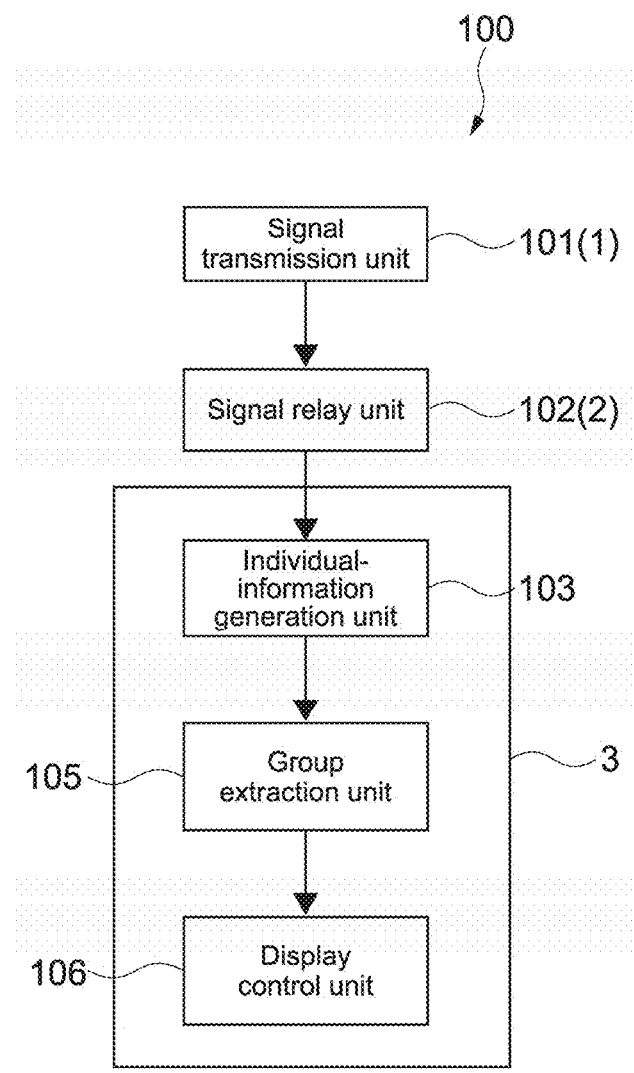
FIG. 18 A block diagram showing a functional configuration of a livestock management system according to another configuration example of Modification 1-7, and a procedure of processes therein.

Alternatively, as shown in FIG. 18, the control unit 31 of the server apparatus 3 may correspond to the individual-information generation unit 103, the group extraction unit 105, and the display control unit 106. In this case, the server apparatus 3 can transmit display-control data items generated by the display control unit 106, and the terminal apparatus 4 can receive the display-control data items, and display images based on the display-control data items on the display unit 44. By generating and transmitting the display data items in this way, the display control unit 106 can cause the display unit 44 to display predetermined image data items. In this configuration example, the livestock management system 100 does not include the individual-information reception unit 104, and the server apparatus 3 corresponds to the "information processing apparatus."

(Modification 1-8: Modification of Individuals)

The individuals in the above-described embodiment are livestock animals. However, the individuals are not limited thereto.

For example, as a modification of the information processing system of this embodiment, an information processing system capable of managing humans can be provided. In this case, the individuals can be the "humans." This information processing system includes the signal transmission unit 101 that transmits signals from transmission apparatuses 1 that can be attached to persons, the signal relay unit 102, the individual-information generation unit 103, the group extraction unit 105, and the display control unit 106. This information processing system is configured to be capable of displaying, as the group indication, a shape of a region occupied by a group that can be constituted by the persons to which the transmission apparatuses 1 are attached.

With this, for example, a conductor who leads groups of, for example, children, the elderly, and tourists can intuitively grasp a distribution of the groups. Further, when the information processing system includes an attention-needing-individual extraction unit described below, a distribution of persons who have separated from a center position of the group, or a distribution of persons to whom special attention needs to be paid can be grasped.

Further, as described above, the "livestock animals" in the present technology include the pets. Thus, the livestock management system according to the present technology is applicable, for example, to breeding management of the pets.

In addition, the present technology is applicable not only to the individuals (living bodies), but also to objects being non-living bodies. In this case, examples of the objects include objects that can temporally change in position, such as logistics transportation packages, vehicles, and robots. The transmission apparatus 1 may be configured to be capable of being attached to these objects, or each of the objects themselves may function as the signal transmission unit 101 capable of transmitting its individual signal.

For example, the above-described livestock management system may include a group extraction unit that extracts a plurality of group constituent objects belonging to a group from a plurality of objects on the basis of object information items of each of the plurality of objects, and a display control unit that causes a display unit to display a shape of a region occupied by the group as a group indication in a map image on the basis of a distribution of position information items of a plurality of peripheral constituent objects that form a periphery of the group among the plurality of group constituent objects.

With this, a user who performs, for example, management of the objects is enabled to intuitively grasp a distribution of the plurality of objects that can form the group.

Second Embodiment

In the first embodiment, description is made of a technology of displaying a shape of a region occupied by a group of, for example, livestock animals in a map image, thereby intuitively and intelligibly displaying the group.

In this embodiment, a technology of enabling additional displaying of attention-needing individuals (livestock animals) to which special attention needs to be paid in a group is described.

Further, individuals in cases described in this embodiment are also livestock animals. However, as described in Modification 1-8, the individuals are not limited thereto.

Note that, configurations similar to those in the first embodiment are denoted by the same reference symbols, and description thereof is omitted.

The attention-needing individuals refer to individuals to which special attention needs to be paid in a group, specifically, refer to individuals in an attention-needing state. Various individuals can be defined as the attention-needing individuals depending on needs of users or types of individuals. For example, when the individuals are livestock animals, the attention-needing individual may be, for example, a leader of a group, a young, a pregnant individual, an individual in estrus, an individual in poor physical condition, an individual exhibiting a peculiar behavior unlike other individuals, and an individual whose transmission apparatus 1 malfunctions.

[Functional Configuration of Livestock Management System]

Figure 19:
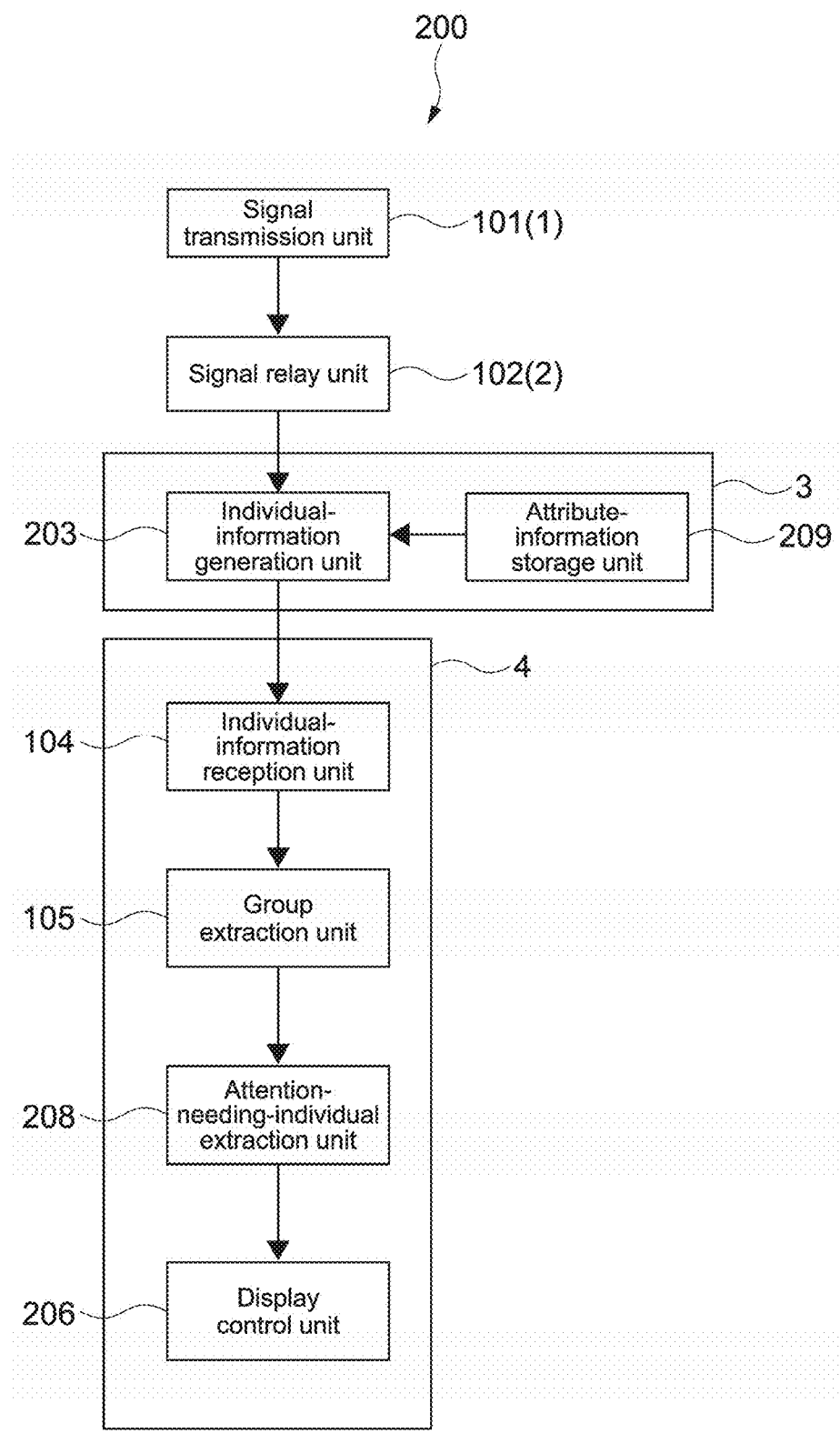
FIG. 19 A block diagram showing a functional configuration of a livestock management system according to a second embodiment of the present technology, and a procedure of processes therein.

FIG. 19 is a block diagram showing a functional configuration of a livestock management system according to the second embodiment of the present technology, and a procedure of processes therein.

A livestock management system 200 includes the signal transmission unit 101, the signal relay unit 102, an individual-information generation unit 203, the individual-information reception unit 104, the group extraction unit 105, and a display control unit 206, and in addition, an attention-needing-individual extraction unit 208 and an attribute-information storage unit 209.

The attribute-information storage unit 209 associates with each other and stores the individual-identification information items included in the individual signals transmitted from the transmission apparatuses 1, and the attribute information items of attributes of individuals to be identified on the basis of the individual-identification information items. The attribute-information storage unit 209 corresponds, for example, to the control unit 31 and the storage unit 32 of the server apparatus 3.

Specific examples of the attribute information items in the case where the individuals are livestock animals include information items of, for example, the leader of a group, a young, the pregnant individual, and a lactating individual.

The attribute-information storage unit 209 is capable of storing the attribute information items, for example, when a user registers the attributes of the livestock animals corresponding to the individual-identification information items via, for example, the terminal apparatus 4 having the livestock management application installed therein. Alternatively, as described below, the attribute-information storage unit 209 may receive and store, as the attribute information items, the condition information items of behaviors and health conditions of the individuals on the basis of the individual signals.

Note that, the attribute-information storage unit 209 may be configured as a single independent database, or may be configured as a part of a database including the group information items and other information items.

In this embodiment, the individual-information generation unit 203 generates, on the basis of the information items stored in the attribute-information storage unit 209, individual information items including the attribute information items stored in association with the individual-identification information items of the individuals from which the individual signals are transmitted.

With this, the individual-information reception unit 104 of the terminal apparatus 4 can receive individual information items of the livestock animals, each of which includes at least a position information item, the attribute information item, and the individual-identification information item.

The attention-needing-individual extraction unit 208 extracts, from a plurality of group constituent individuals, an attention-needing individual that has been determined to be in the attention-needing state on the basis of individual information items each of the plurality of group constituent individuals. The attention-needing-individual extraction unit 208 corresponds, for example, to the control unit 41 of the terminal apparatus 4.

In this embodiment, the attention-needing-individual extraction unit 208 determines that a group constituent individual having an attention-needing attribute is in the attention-needing state on the basis of attribute information items of the plurality of group constituent individuals.

The attention-needing attribute refers to an attribute to which special attention needs to be paid in a group, such as attributes of, for example, the leader, the young, and the pregnant individual.

Further, the attention-needing-individual extraction unit 208 need not necessarily be limited to the example of extracting one attention-needing individual, and may extract a plurality of attention-needing individuals.

The display control unit 206 causes the display unit 44 to display the group indication in a map image. In this embodiment, the display control unit 206 causes the display unit 44 to display an information item of the attention-needing individual as an attention-needing-individual indication in the map image.

The attention-needing-individual indication is not particularly limited as long as some information items of the attention-needing individual are displayed. For example, an icon indicating the attention-needing individual may be displayed at a position where the attention-needing individual is distributed. This icon may be, for example, an icon schematically indicating a livestock animal, or may be graphics such as a circle and a quadrangle.

Alternatively, the display control unit 206 may cause the display unit 44 to display the individual-identification information item such as an individual identifier associated with the attention-needing individual as the attention-needing-individual indication in the map image.

Still alternatively, the display control unit 206 may cause the display unit 44 to display information items of contents of the attention-needing state of the attention-needing individual as the attention-needing-individual indication in the map image. Examples of the contents of the attention-needing state include information items of the attention-needing attributes of, for example, the leader, the young, and the pregnant individual, and a condition information item of a livestock animal described below.

Yet alternatively, the display control unit 206 may cause the display unit 44 to display a warning as the attention-needing-individual indication in the map image. Examples of a method of displaying the warning include methods of changing colors of and flashing, for example, the group indication, the icon, the displayed individual-identification information item, and the displayed individual-number indication. Alternatively, the warning may be displayed by displaying a phrase such as "WARNING" and a mark such as "!."

By displaying the attention-needing individual, presence of an individual to which special attention should be paid and an information item of its position can be provided to a user managing a large number of livestock animals. With this, the livestock animals can be managed efficiently and properly.

[Operation Example]

Figure 20:
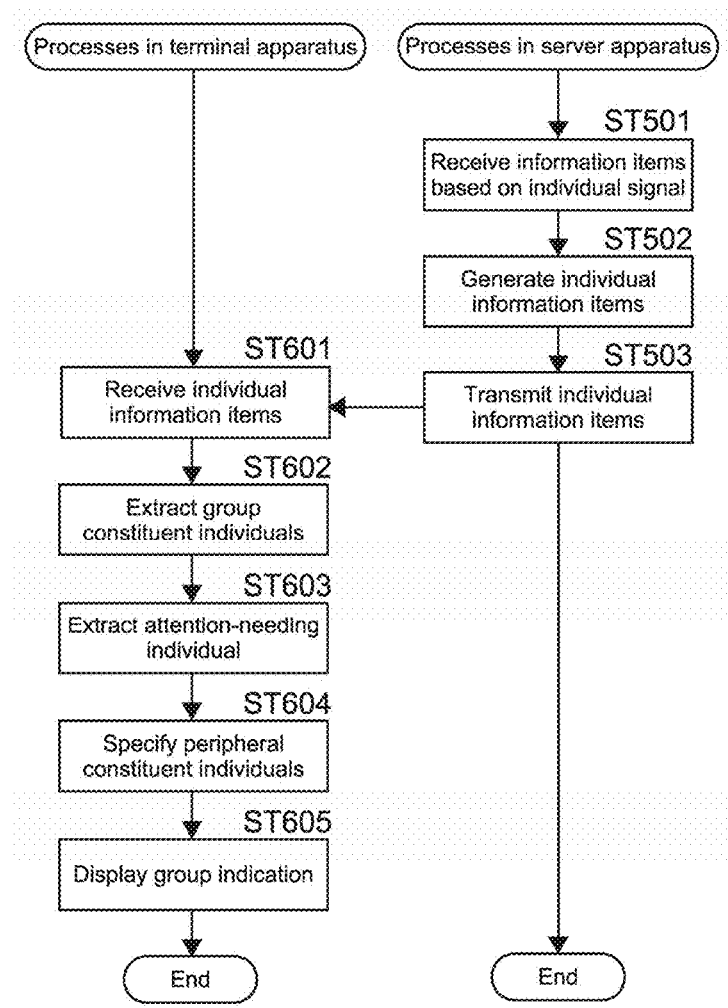
FIG. 20 A flowchart showing an operation example of the livestock management system.

FIG. 20 is a flowchart showing an operation example of the livestock management system 200.

This operation example is described by way of an example in which an individual having an attribute information item "Leader" is displayed as the attention-needing individual.

Further, with regard to an operation in an entirety of the system, which includes the operations by the plurality of transmission apparatuses 1 and the one or more relay apparatuses 2, these operations by the plurality of transmission apparatuses 1 and the one or more relay apparatuses 2 are similar to those in the first embodiment. Thus, illustration and description thereof are omitted.

Note that, in FIG. 20, processes of ST501 to ST503 are executed by the server apparatus 3, and processes of ST601 to ST605 are executed by the terminal apparatus 4.

The server apparatus 3 receives the information items of the individual signal, and the information item of a signal intensity at the time of receiving the individual signal, which are transmitted from the relay apparatus 2 (ST501).

Next, on the basis of the individual signal transmitted from the transmission apparatus 1 attached to each of the plurality of livestock animals, the individual-information generation unit 203 of the server apparatus 3 generates individual information items of each of the livestock animals (ST502). In this operation example, on the basis of the information items stored in the attribute-information storage unit 209, the individual-information generation unit 203 generates individual information items including not only the attribute information items stored in association with the individual-identification information items of the individuals from which the individual signals are transmitted, and the individual-identification information items themselves, but also position information items of these individuals.

Figures 21, 22:
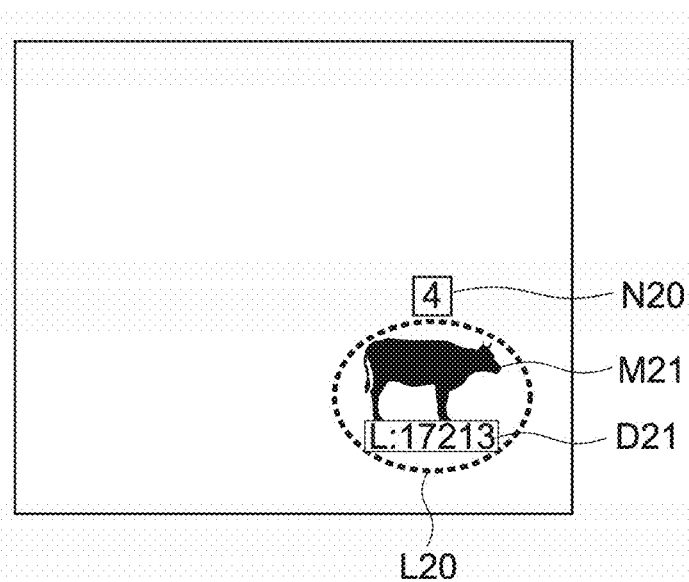
FIG. 21 A view showing an example of a table showing correspondences between individual-identification information items and attribute information items stored in an attribute-information storage unit shown in FIG. 19.
FIG. 22 An image example of a map image in which a group indication and attention-needing-individual indications are displayed in the operation example shown in FIG. 20.

FIG. 21 is a view showing an example of a table showing correspondences between the individual-identification information items and the attribute information items stored in the attribute-information storage unit 209.

"Livestock Animal ID" shown in FIG. 21 indicates individual identifiers of the livestock animals as an example of the individual-identification information items. Further, the column "Attribute Information" stores the attribute information items of the individuals corresponding to the individual identifiers. In the example shown in FIG. 21, the attribute information item "Leader" is stored in association with a livestock animal having a livestock animal ID "17213," and the attribute information item "Young" is stored in association with a livestock animal "13020." These attribute information items may be information items of the attributes that the user has registered in association with the individual identifiers via, for example, the livestock management application as described above.

Further, individuals that have no registered information items can be regarded as those having attribute information items "No Predetermined Attribute." In FIG. 21, fields for the attribute information items of such individuals are left blanks.

Note that, the position information items may be the position information items (latitudes and longitudes) of the livestock animals that are calculated by the method described with reference to FIG. 6 in the operation example of the first embodiment. Alternatively, as described in Modification 1-5, the position information items included in the individual signals may be used.

Then, the communication unit 33 of the server apparatus 3 transmits the individual information items to the terminal apparatus 4 via the network N (ST503).

Next, the individual-information reception unit 104 of the terminal apparatus 4 receives the individual information items (ST601). In this operation example, the individual-information reception unit 104 receives, as the individual information items, the ID and the information items of the calculated latitude and longitude of each of the livestock animals.

After that, on the basis of the individual information items, the group extraction unit 105 extracts, from the plurality of livestock animals, a plurality of group constituent individuals belonging to a group (ST602). Also in this operation example, as in the operation example of the first embodiment, the group extraction unit 105 is capable of extracting, from the plurality of individuals, a plurality of livestock animals that have been determined to be in the aggregated state as a plurality of group constituent individuals.

Then, on the basis of attribute information items of the plurality of group constituent individuals, the attention-needing-individual extraction unit 208 determines that a group constituent individual having the attention-needing attribute is in the attention-needing state, and then extracts this attention-needing individual that has been determined to be in the attention-needing state (ST603).

In this operation example, the attention-needing attribute is "Leader." With this, on the basis of the attribute information items, the attention-needing-individual extraction unit 208 determines that a group constituent individual having the attribute "Leader" (in the example shown in FIG. 21, the individual having the livestock animal ID "17213,") is in the attention-needing state. In this way, this individual is determined as the attention-needing individual.

Next, on the basis of position information items of the plurality of group constituent individuals, the group extraction unit 105 specifies a plurality of peripheral constituent individuals that form a periphery of the group among the plurality of group constituent individuals (ST604).

Lastly, the display control unit 206 causes the display unit 44 to display a shape of a region occupied by the group on the basis of a distribution of position information items of the plurality of peripheral constituent individuals in a map image, and to display an information item of the attention-needing individual as the attention-needing-individual indication in the map image (ST605).

FIG. 22 shows an image example of the map image in which the group indication and the attention-needing-individual indications are displayed.

In the example shown in FIG. 22, the display control unit 206 causes the display unit 44 to display, as the group indication, a boundary line L20 formed on the basis of the distribution of the plurality of peripheral constituent individuals.

Further, the display control unit 206 causes the display unit 44 to display, as the attention-needing-individual indications in the map image, an icon M21 arranged at a position where the attention-needing individual is distributed, and an individual identifier (livestock animal ID) D21 associated with the attention-needing individual. The letter "L" added to the individual identifier D21 indicates the attribute "Leader."

The icon M21 can be displayed in size corresponding to the number of the plurality of group constituent individuals, and can be displayed as both the individual-number indication and the attention-needing-individual indication.

Further, the display control unit 206 can cause the display unit 44 to display a number N20 of the group constituent individuals as the individual-number indication.

With this, a size of the group can be intelligibly and simply displayed. In addition, a distribution of the leader to which special attention should be paid in the group also can be displayed.

As described hereinabove, according to this embodiment, a group of, for example, livestock animals can be intuitively displayed, and in addition, a position of an attention-needing individual that is important in management of, for example, the livestock animals can be displayed. With this, the management of, for example, the livestock animals can be performed efficiently and properly.

[Modification of Second Embodiment]

(Modification 2-1: Modification of Attention-Needing Individual)

In the above-described operation example, one individual having the attribute "Leader" is displayed as an attention-needing individual. However, as a matter of course, the attention-needing individual is not limited thereto.

The attention-needing attribute may include other attributes to which the user wants to pay attention, such as the young, the pregnant individual, and a diseased individual.

Figure 23:
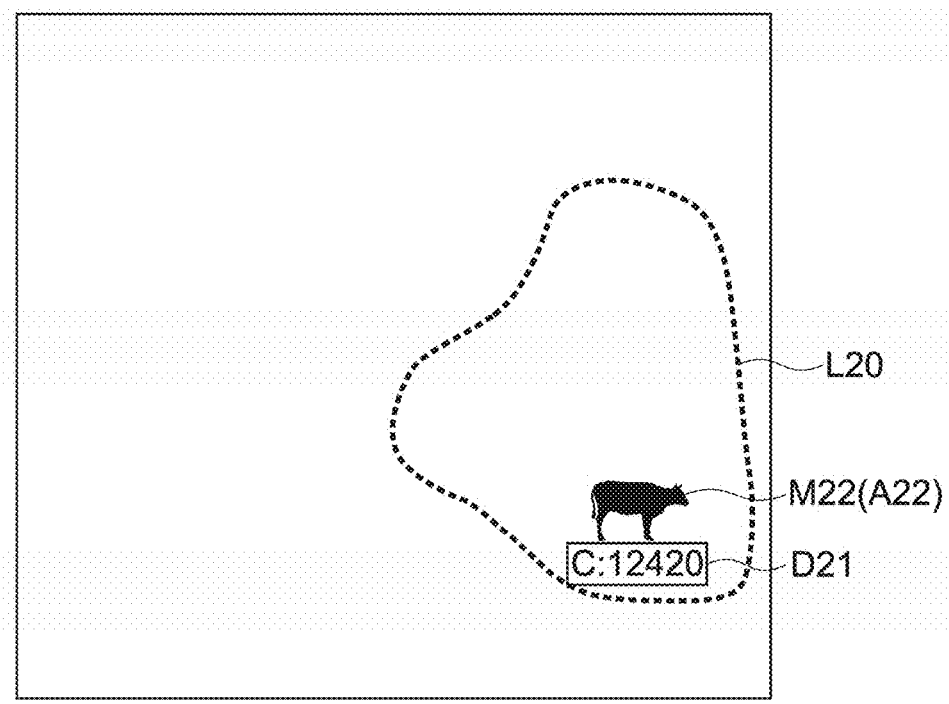
FIG. 23 A view showing a method of displaying a group indication and attention-needing-individual indications according to Modification 2-1.

FIG. 23 shows another image example of the map image in which the group indication and the attention-needing-individual indications are displayed.

In the example shown in FIG. 23, the display control unit 206 displays, as the group indication, the boundary line L20 formed on the basis of the distribution of the plurality of peripheral constituent individuals. Further, the display control unit 206 causes the display unit 44 to display, as the attention-needing-individual indications in the map image, an icon M22 arranged, inside the boundary line L20 corresponding to a group to which the attention-needing individual belongs, at a position where the attention-needing individual is distributed, and an individual identifier (livestock animal ID) D22 associated with the attention-needing individual. The letter "C" added to the individual identifier D21 indicates the attribute "Young (calf)."

In this way, individuals having attributes as appropriate can be displayed as the attention-needing individuals.

(Modification 2-2: Modification in which Attention-Needing Individual is Extracted on Basis of Position or Movement of Individual)

In the above-described second embodiment, the attention-needing state is determined on the basis of the attribute information items included in the individual information items. However, how the attention-needing state is determined is not limited thereto.

The attention-needing-individual extraction unit 208 may determine whether or not the plurality of group constituent individuals are in the attention-needing state by comparing a position or a movement of an entirety of the plurality of group constituent individuals and positions or movements of the plurality of group constituent individuals to each other on the basis of position information items of the plurality of group constituent individuals. In other words, the attention-needing-individual extraction unit 208 is capable of determining, as an attention-needing individual, an individual that exhibits a peculiar movement or is located at a peculiar position in comparison with the position or the movement of the entirety of the group.

Figure 24:
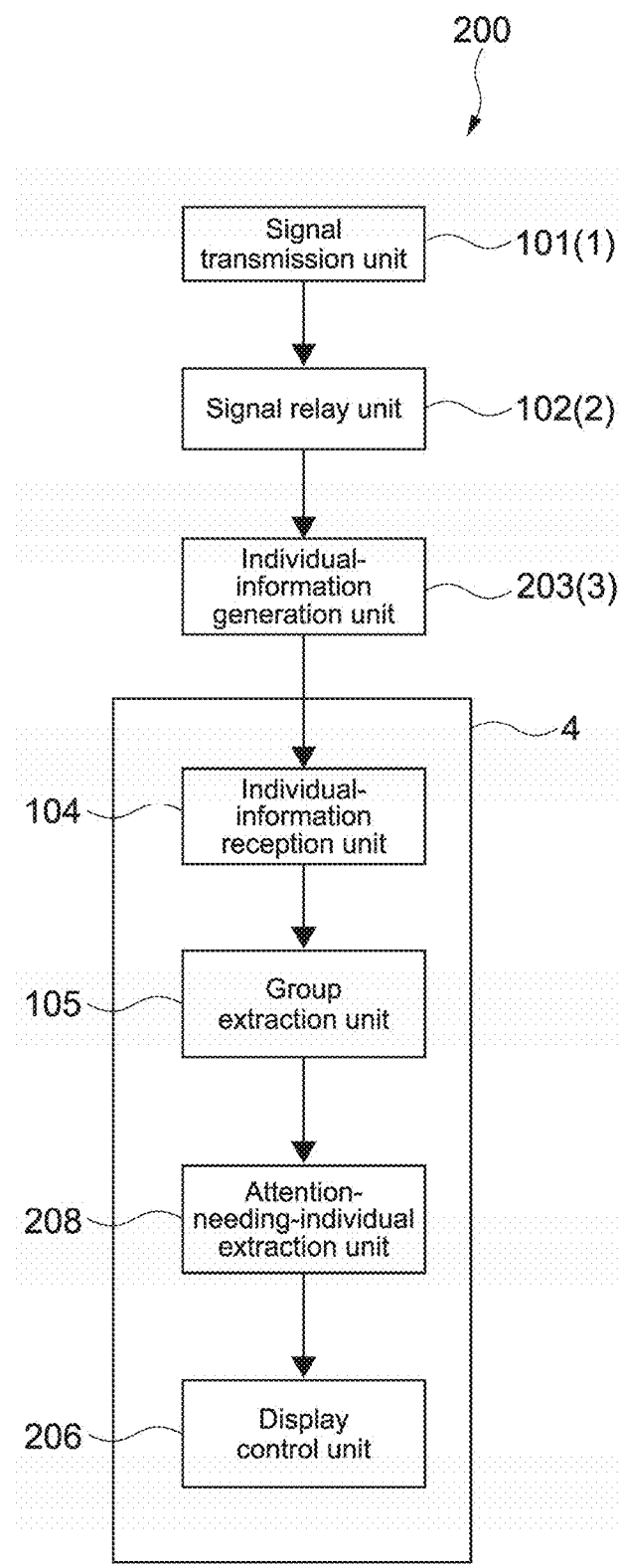
FIG. 24 A schematic view showing a functional configuration of a livestock management system according to Modification 2-2.

In Modification 2-2, as shown in FIG. 24, the livestock management system 200 need not necessarily include the attribute-information storage unit 209. With this, the individual-information generation unit 203 can generate individual information items that do not include the attribute information items.

In this modification, the attention-needing-individual extraction unit 208 may temporally calculate, on the basis of the position information items of the plurality of group constituent individuals, individual velocity vectors being velocity vectors of the plurality of group constituent individuals, and a group velocity vector being a velocity vector of the entirety of the group, and may determine, by comparing the group velocity vector at a first time point and the individual velocity vectors of the plurality of group constituent individuals at a second time point before the first time point to each other, that an individual having the individual velocity vector at the second time point corresponding to the group velocity vector at the first time point is in the attention-needing state. In other words, the attention-needing-individual extraction unit 208 is capable of determining an individual that moves ahead of all the other individuals in the group as an attention-needing individual.

In this case, when the individual-information reception unit 104 receives the individual information items in a predetermined cycle, the position information items that the attention-needing-individual extraction unit 208 has received can be temporally processed. With this, the information items of the movements can be calculated. A time interval between the first time point and the second time point is not particularly limited, and may be set as appropriate in accordance, for example, with an average moving speed of livestock animals.

Further, the group velocity vector may be, for example, a velocity vector of a center of gravity of a region occupied by the group, or may be a velocity vector calculated from an average value of velocity vectors of livestock animals A21 to A24.

Still further, the "individual velocity vector corresponding to the group velocity vector" refers to a velocity vector that matches the group velocity vector, or a velocity vector that is similar to the group velocity vector. Examples of the latter include a velocity vector having a velocity absolute value and an orientation within predetermined ranges with respect to the group velocity vector, and a velocity vector having component absolute values and an orientation within predetermined ranges with respect to the group velocity vector.

Figure 25A:
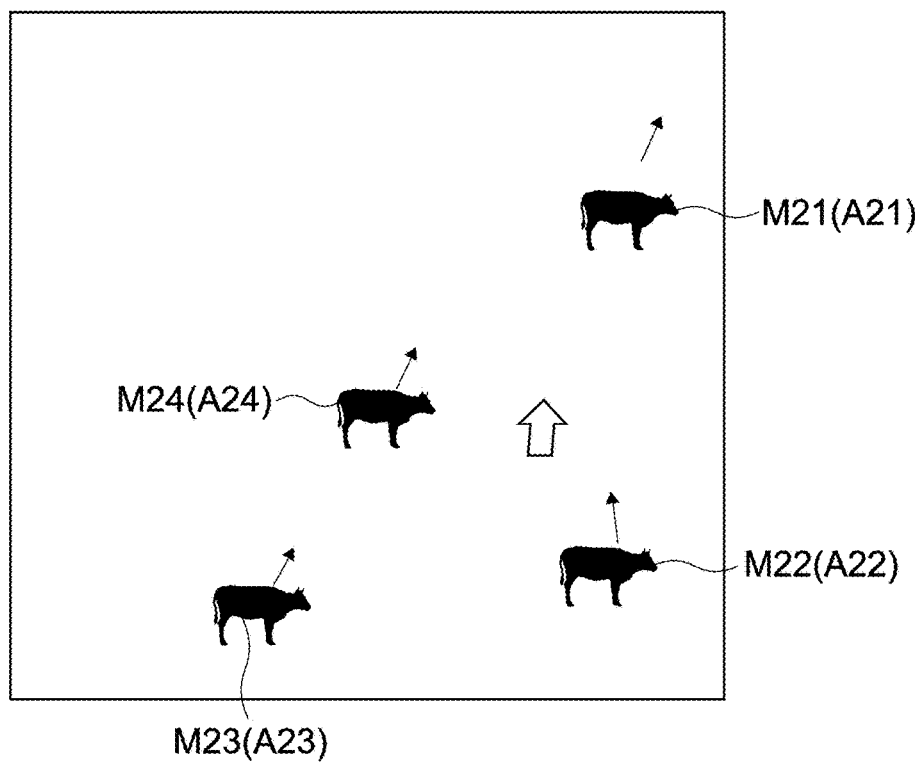
FIGS. 25A and 25B Views showing a method of determining an attention-needing state according to Modification 2-2.
Figure 25B:
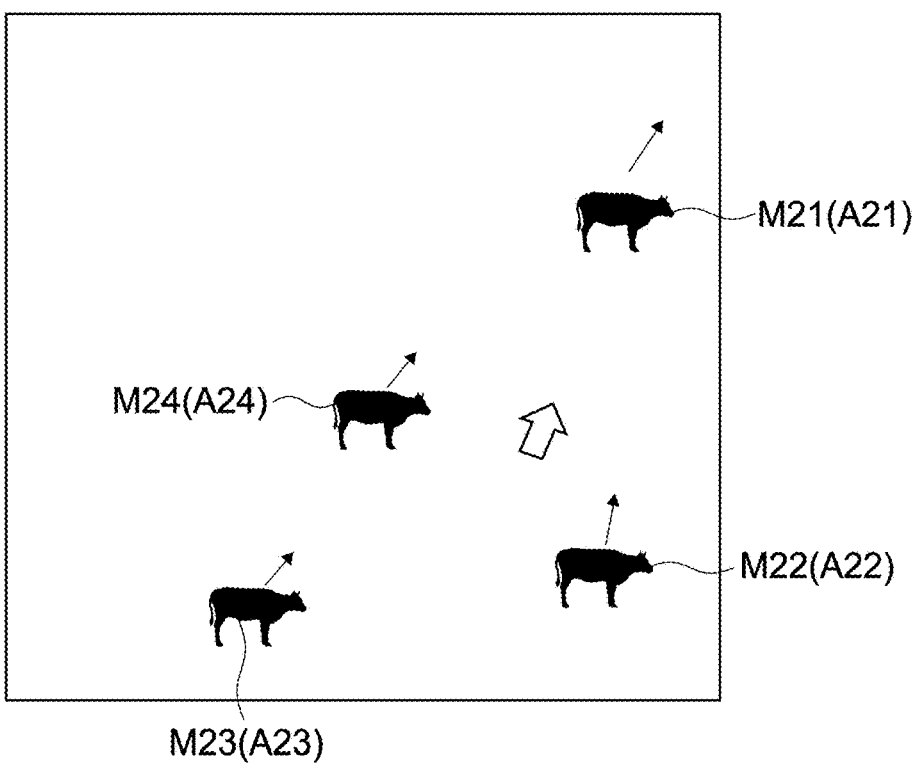

Views of FIGS. 25A and 25B show the method of determining the attention-needing state according to Modification 2-2 by way of an image example in which the icons M21 to M24 are displayed. Specifically, FIG. 25A shows an image example of a map image in which the icons M21 to M24 respectively indicating positions of the livestock animals A21 to A24 at the second time point are displayed. FIG. 25B shows another image example of the map image in which the icons M21 to M24 respectively indicating positions of the livestock animals A21 to A24 at the first time point are displayed. Note that, the images shown in FIGS. 25A and 25B may be displayed or need not necessarily be displayed on the terminal apparatus 4.

Further, the solid arrows in FIGS. 25A and 25B indicate the velocity vectors of the livestock animals, and the hollow arrows indicate the average velocity vectors calculated from the average values of the velocity vectors of the livestock animals A21 to A24.

The velocity vector of the livestock animal A21 shown in FIG. 25A is different from the group velocity vector shown in FIG. 25A, but substantially matches the group velocity vector shown in FIG. 25B. The livestock animals A22 to A24 other than the livestock animal A21 follow the movement of the livestock animal A21. In this case, the attention-needing-individual extraction unit 208 determines that the livestock animal A21 is in the attention-needing state, and extracts the livestock animal A21 as the attention-needing individual. This attention-needing state may correspond, for example, to the leader of the group.

In groups of livestock animals, an individual that moves in a manner of leading other individuals can be recognized as a leader that leads the group. In this modification, by utilizing this habit, the individual as the leader can be extracted.

Note that, as another example of this modification, the attention-needing-individual extraction unit 208 may calculate the average moving speed of the plurality of group constituent individuals on the basis of the position information items of the group constituent individuals, calculate moving speeds of the plurality of group constituent individuals on the basis of the position information items of the group constituent individuals, and determine that, among the plurality of group constituent individuals, an individual that moves at a moving speed higher than the average moving speed of the plurality of group constituent individuals by a predetermined speed or higher is in the attention-needing state. With this, an individual that moves at a speed higher than an average speed of the entirety of the group can be determined to be in the attention-needing state. Thus, for example, an excited individual and an individual that is about to escape can be easily extracted.

Alternatively, the attention-needing-individual extraction unit 208 may calculate a center position of each of the plurality of group constituent individuals from the position information items of the plurality of group constituent individuals, and extract, from the plurality of group constituent individuals, an individual that is separated from the center position by a predetermined separation distance or longer as an attention-needing individual.

The center position may be, for example, an average position of the plurality of group constituent individuals, or an average position of individuals in the aggregated state among the group constituent individuals. Note that, the method of determining the aggregated state described in the first embodiment may be applied as appropriate.

In this case, as described in Modification 1-1, the server apparatus 3 may include the group-information storage unit 107, and group information items of livestock animals may be included in the individual information items. With this, individuals that are not in the aggregated state can be processed in the same group.

Figure 26:
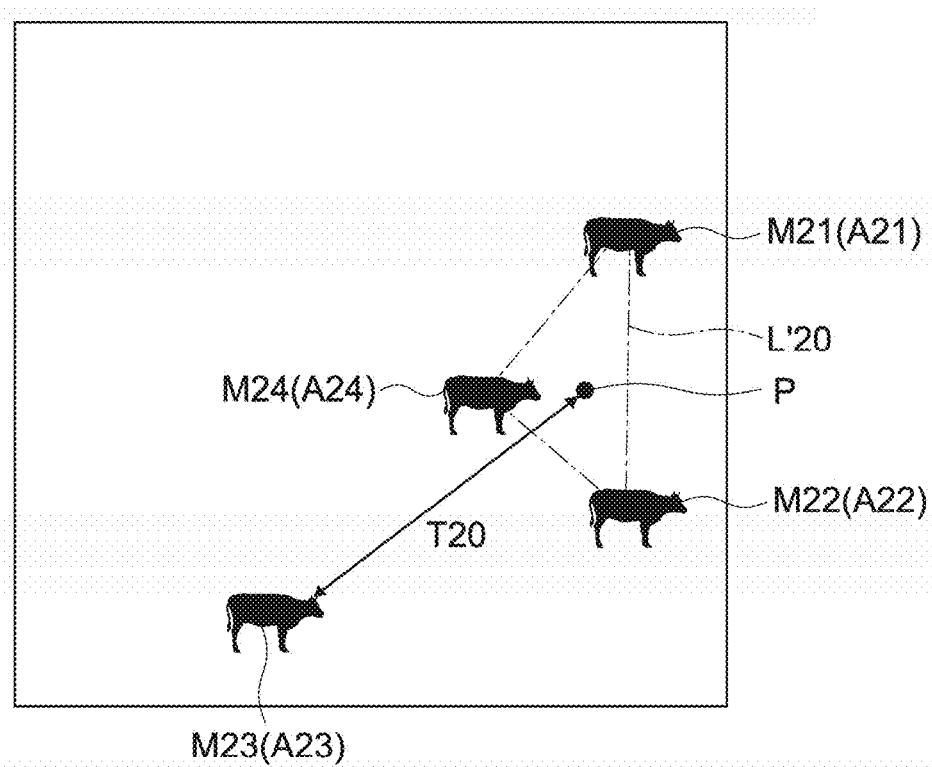
FIG. 26 A view showing another method of determining the attention-needing state according to Modification 2-2.

FIG. 26 is a view showing another method of determining the attention-needing state according to Modification 2-2 by way of an image example in which the icons M21 to M24 respectively indicating positions of the livestock animals A21 to A24, and a line L'20 based on a distribution of position information items of peripheral constituent individuals are displayed in a map image. Note that, the image shown in FIGS. 25A and 25B may be displayed or need not necessarily be displayed on the terminal apparatus 4.

All the livestock animals A21 to A24 belong to the same group registered in advance.

As shown in FIG. 26, the livestock animal A23 is separated from a center position P by a predetermined distance T20 or longer. With this, the attention-needing-individual extraction unit 208 can determine that the livestock animal A23 is in the attention-needing state.

In this way, according to this modification, a position of, for example, a livestock animal that has separated from a group during grazing or the like can be displayed, which enables prompt treatment for, for example, the livestock animal.

(Modification 2-3: Modification in which Attention-Needing Individual is Extracted on Basis of Information Items that can be Acquired from Individual Signals)

Further, when the power generation amounts of the power generation units 111 of the transmission apparatuses 1 vary in accordance with behaviors and health conditions of livestock animals, the individual-information generation unit 203 may generate individual information items including condition information items on the basis of individual signals. In this case, the attention-needing-individual extraction unit 208 can extract an attention-needing individual by determining whether or not the livestock animals are in the attention-needing state on the basis of the condition information items of the livestock animals.

The condition information items include information items of conditions of the livestock animals, such as the behaviors and the health conditions of the livestock animals, more specifically, include information items of activity amounts, the health conditions, and staying places.

Further, also in Modification 2-3, the livestock management system 200 need not necessarily include the attribute-information storage unit 209 (refer to FIG. 24). With this, the individual-information generation unit 203 can generate the individual information items that do not include the attribute information items.

Now, an example of the method of generating the condition information items from the individual signals is described.

As described in the first embodiment, the transmission apparatus 1 includes the power generation unit 111 constituted, for example, by a vibration power generator, a thermoelectric conversion element, or a solar power generator. The communication unit 13 can be activated to transmit the individual signal when the power generation amount of the power generation unit 111 is equal to or larger than a predetermined power generation amount. With this, the power generation amount of the power generation unit 111 can be grasped on the basis of a frequency of receiving the individual signals from the transmission apparatuses 1. Thus, when the power generation amount of the power generation unit 111 and the condition of the livestock animal correlate with each other, the individual-information generation unit 203 can generate the individual information items including the condition information item of the condition of the livestock animal on the basis of the frequency of receiving the individual signal, or on the basis of an information item of the power generation amount calculated from the reception frequency.

Specifically, when the power generation unit 111 includes the vibration power generator, the individual-information generation unit 203 can estimate an activity amount of the livestock animal on the basis of the power generation amount, and generate individual information items including the information item of the activity amount. Further, when the power generation unit 111 includes the thermoelectric conversion element, the individual-information generation unit 103 can estimate a body temperature of the livestock animal on the basis of the information item of the power generation amount, and on the basis of an information item of an ambient temperature, and generate individual information items including an information item of the body temperature of the livestock animal. In addition, the individual-information generation unit 103 can estimate whether or not the livestock animal is in estrus on the basis, for example, of the estimated body temperature and the estimated activity amount of the livestock animal, and generate individual information items including an information item that the livestock animal is in estrus. Further, when the power generation unit 111 includes the solar power generator, the individual-information generation unit 203 can estimate which of indoors and outdoors the livestock animal stays on the basis of the power generation amount, and generate individual information items including the information item of the staying place.

When the individual information items respectively include the condition information items of the plurality of livestock animals in this way, the attention-needing-individual extraction unit 208 can extract, from the plurality of group constituent individuals, an attention-needing individual that has been determined to be in the attention-needing state on the basis of the condition information items.

For example, the attention-needing-individual extraction unit 208 can determine that an individual whose activity amount acquired as the condition information item has decreased or increased is in the attention-needing state. As a criterion for determining whether the activity amount has decreased or increased, there may be used, for example, an activity amount that is larger or smaller by a predetermined value or larger than an average value of that of an entirety of the group constituent individuals, or an activity amount that is equal to or smaller than a reference value, or equal to or larger than the reference value.

Alternatively, the attention-needing-individual extraction unit 208 can determine, from the information item of the body temperature, which has been acquired as the condition information item, that an individual whose body temperature is higher than an average value of those of the group constituent individuals is in the attention-needing state.

In addition, the attention-needing-individual extraction unit 208 can determine, from the information item as to whether or not an individual is in estrus, which has been acquired as the condition information item, that an individual that has been estimated to be in estrus is in the attention-needing state.

In this way, the attention-needing individual can be extracted on the basis of the conditions of the livestock animals.

Alternatively, the transmission apparatus 1 may include, in addition to the power generation unit 111 or instead of the power generation unit 111, a sensor capable of detecting the condition of the individual. In this case, the transmission apparatus 1 can transmit an individual signal including a sensor information item obtained by the sensor, and the individual-information generation unit 203 can generate, on the basis of the sensor information item, the individual information items including the condition information item of the condition of the livestock animal.

Examples of such a sensor include activity-amount sensors such as a vibration sensor and an acceleration sensor, livestock vital sensors that output livestock vital data items, such as a body-temperature sensor, and sensors capable of obtaining climate data items of, for example, temperature, humidity, precipitation, wind speed, and air pressure. Further, the transmission apparatus 1 may include a plurality of such sensors.

Also with this, the attention-needing-individual extraction unit 208 can extract the attention-needing individual on the basis of the above-described condition information items.

(Modification 2-4: Modification of how Warning is Displayed)

The method of displaying an attention-needing individual is not limited to the example shown, for example, in FIG. 22.

For example, the display control unit 206 may cause the display unit 44 to display a warning as an attention-needing individual in a map image.

Figure 27:
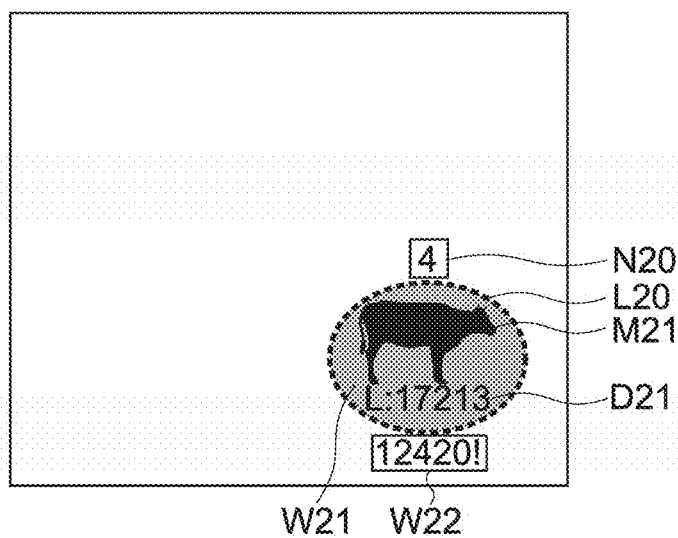
FIG. 27 A view showing an example of a display method according to Modification 2-4.

FIG. 27 is a view showing an example of a display method according to Modification 2-4 by way of an image example in which warnings are displayed in the map image.

In the example shown in FIG. 27, both the livestock animal A21 and the livestock animal A22 are attention-needing individuals. The livestock animal A21 is a first attention-needing individual in an attention-needing state corresponding to the attribute "Leader," and the livestock animal A22 is a second attention-needing individual in an attention-needing state corresponding to the attribute "Young (calf)."

The group indication L20, the indication N20 of the number of individuals, the icon M21 being an attention-needing-individual indication of the first attention-needing individual A21, and the individual identifier D21 of the same in FIG. 27 are similar to those in the example shown in FIG. 22.

Further, the display control unit 206 causes the display unit 44 to display, as an attention-needing-individual indication of the second attention-needing individual A22, a first warning W21 of flashing the region in the boundary line L20, and a second warning W22 including an individual identifier of the second attention-needing individual A22. The second warning W22 includes the mark "!" added to the end of the individual identifier. With this, warning that the livestock animal corresponding to this individual identifier is an attention-needing individual is highlighted.

In this way, an attention-needing individual that needs prompt treatment or careful management can be intelligibly displayed to users.

The method of displaying the warnings is not limited to the above-described method.

Figure 28A:
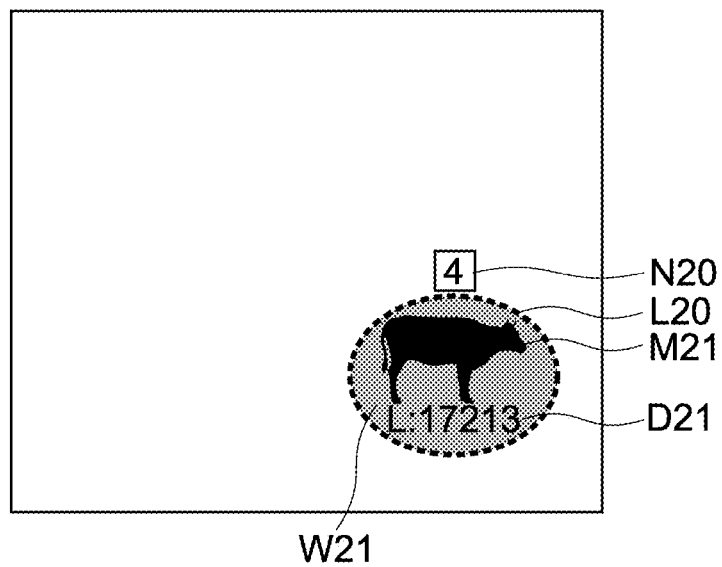
FIGS. 28A and 28B Views showing another example of the display method according to Modification 2-4.

For example, as shown in FIG. 28A, only the first warning W21 of flashing the region in the boundary line L20 may be displayed as the attention-needing-individual indication of the second attention-needing individual A22. Also when the individual-identification information item is not included in the indicated warning, as described below in Modification 2-5, by performing an input operation, for example, to the indicated warning, detailed information items can be acquired as appropriate.

Figure 28B:
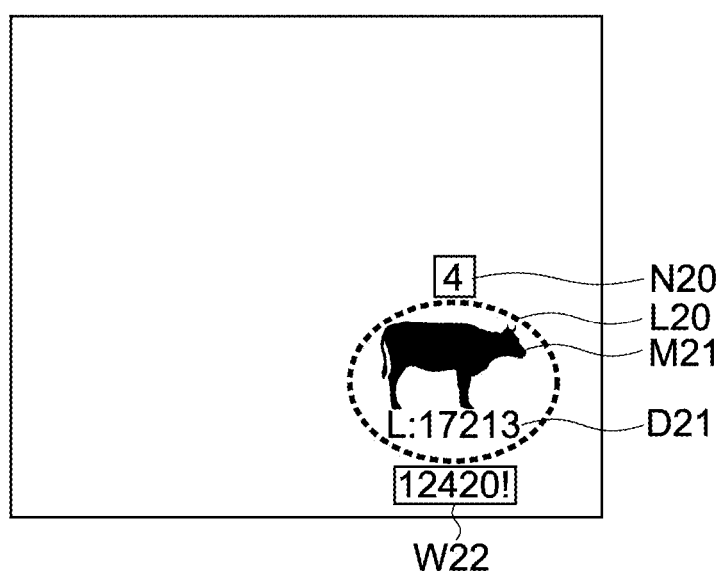

Alternatively, as shown in FIG. 28B, the second warning W22 may be displayed as the attention-needing-individual indication of the second attention-needing individual A22. Still alternatively, although not shown, only the mark "!" or the like may be displayed instead of the second warning W22.

Figure 29:
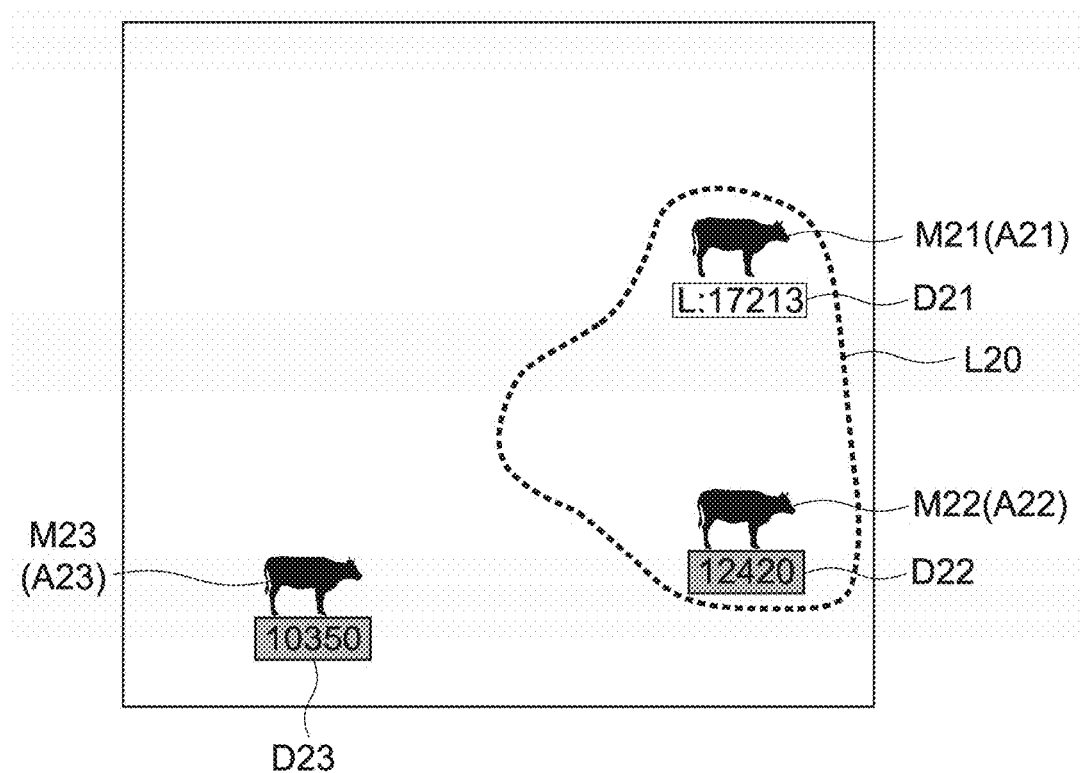
FIG. 29 A view showing still another example of the display method according to Modification 2-4.

Further, FIG. 29 is a view showing still another example of the method of displaying the warnings.

As shown in FIG. 29, at the time of displaying the warnings, for example, indications of individual identifiers of attention-needing individuals in predetermined attention-needing states may be flashed.

In the example shown in FIG. 29, all the livestock animals A21, A22, and A23 are attention-needing individuals. The livestock animal A21 is the first attention-needing individual that has been determined as a leader on the basis of its attribute information item. The livestock animal A22 is the second attention-needing individual that has been determined as a young (specifically, calf) on the basis of its attribute information item. The livestock animal A23 is a third attention-needing individual that has been determined to be separated by a predetermined distance or longer from a center position of a group (refer to modification 2-2).

In FIG. 29, the group indication L20, the icons M21 to M24 of the livestock animals A21 to A24, the indications D21, D22, and D23 of the individual identifiers of the livestock animals A21 to A24 are displayed as attention-needing-individual indications of the attention-needing individuals.

Of those, the individual identifiers D22 and D23 are displayed as flashing warnings.

Also by such a method of displaying the warnings, indication of warnings of individuals to which special attention needs to be paid can be displayed.

(Modification 2-5: Modification of Auxiliary Indication)

As in Modification 1-4, the display control unit 206 may cause the display unit 44 to display, in response to input operations to attention-needing-individual indications by a user, individual information items of attention-needing individuals corresponding to the attention-needing-individual indications.

Figure 30:
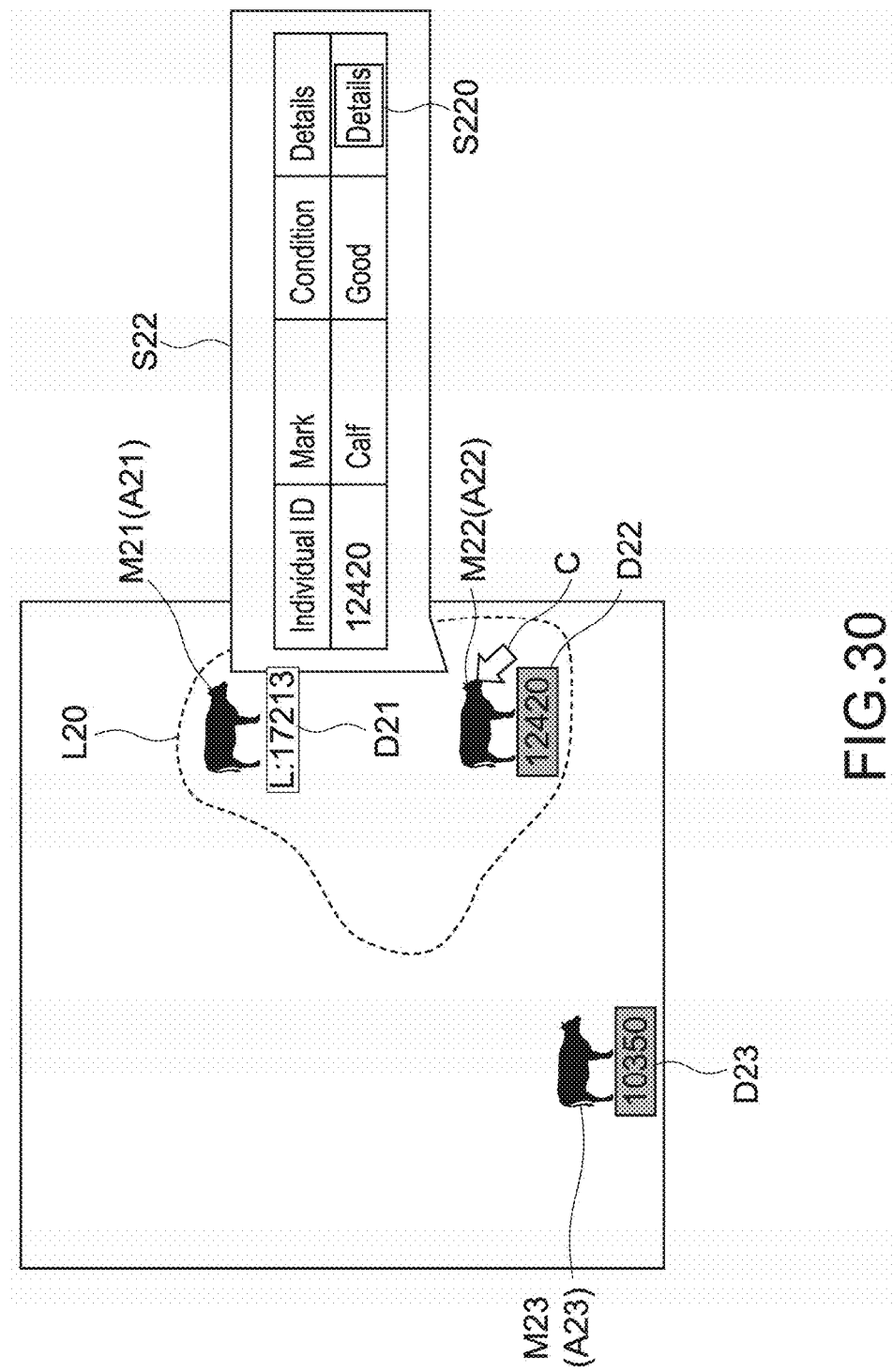
FIG. 30 A view showing an example of a display method according to Modification 2-5.

FIG. 30 is a view showing a display method according to Modification 2-5 by way of an image example in which a group indication and some individual information items are displayed in a map image.

For example, the input operation unit 45 of the terminal apparatus 4 receives the input operation to the attention-needing-individual indication by the user. Examples of this input operation may include touching, pinching-out, and clicking with respect to the attention-needing-individual indication. The reference symbol C in FIG. 30 denotes a cursor.

When the input operation is received, the display control unit 206 causes the display unit 44 to display the individual information items of the attention-needing individual corresponding to the attention-needing-individual indication. An indication S22 of the individual information items includes an individual-identification information item (identifier) of a group constituent individual listed as "Individual ID," an attribute information item and a condition information item of the individual, and a detail display button 5220 corresponding to those information items. When a predetermined input operation such as touching and clicking is performed with respect to the detail display button 5220, the display control unit 206 may cause the display unit 44 to display other individual information items of the corresponding individual. Specific examples of the other individual information items include the group information items of groups to which the livestock animals respectively belong, and the respective position information items of the individuals.

With this, further detailed information items of the individual displayed together with its attention-needing-individual indication can be provided in response to requests from the user. Thus, the user can check the detailed information items of the attention-needing individual, and can provide prompt and proper treatment in accordance with a situation based on these information items.

(Modification 2-6: Another Modification of Attention-Needing-Individual Indication)

Figure 31:
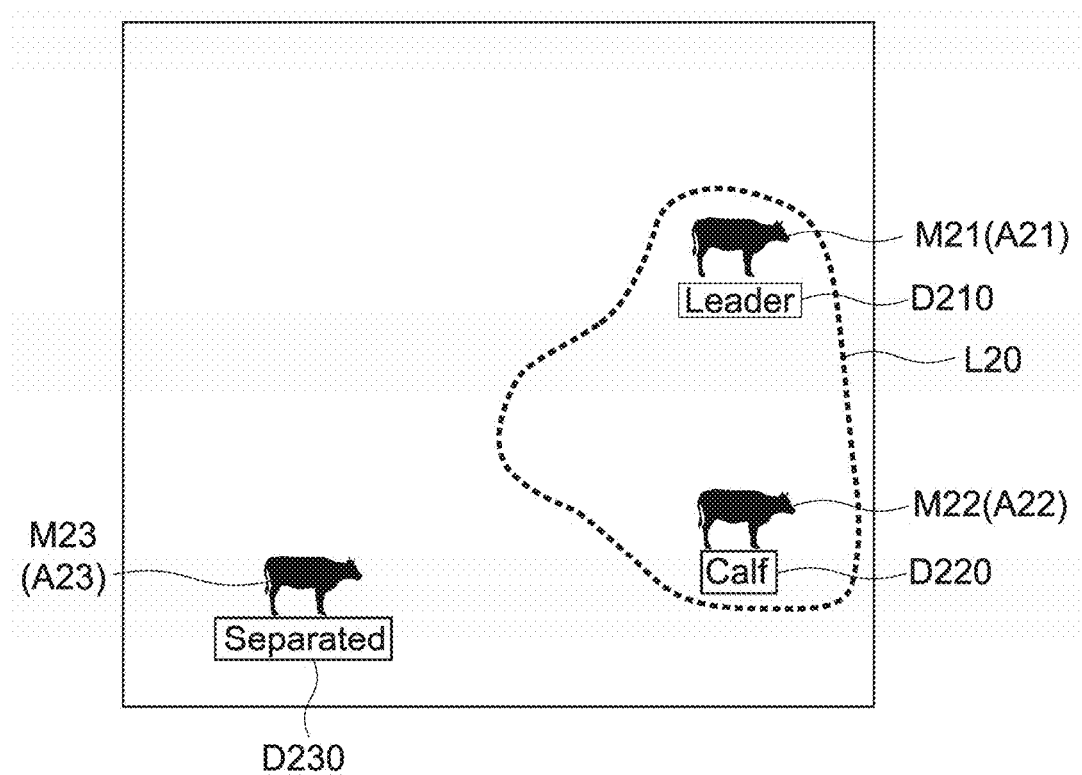
FIG. 31 A view showing an example of a display method according to Modification 2-6.

Further, as shown in FIG. 31, contents of attention-needing states can be displayed as the attention-needing-individual indications.

For example, when the livestock animal A21 is the first attention-needing individual that has been determined as a leader on the basis of its attribute information item, the display control unit 206 may cause the display unit 44 to display, for example, the icon M21 at a position of the livestock animal A21, and a content indication D210 of the attention-needing state corresponding to "Leader." Similarly, when the livestock animal A22 is the second attention-needing individual that has been determined as a young (specifically, calf) on the basis of its attribute information item, the display control unit 206 may cause the display unit 44 to display, for example, the icon M22 at a position of the livestock animal A22, and a content indication D220 of the attention-needing state corresponding to "Calf." When the livestock animal A23 is the third attention-needing individual that has been determined to be separated by a predetermined distance or longer from a center position of a group, the display control unit 206 may cause the display unit 44 to display, for example, the icon M23 at a position of the livestock animal A23, and a content indication D230 of the attention-needing state corresponding to "Separated."

In this way, information items of the attention-needing individuals can be easily checked.

As a matter of course, the present technology is not limited only to the embodiments described hereinabove of the present technology, and various changes can be made without departing from the gist of the present technology. For example, the embodiments of the present technology may be combined with each other.

Note that, the present technology may also provide the following configurations.

(1) An information processing apparatus, including:

a group extraction unit that extracts a plurality of group constituent individuals belonging to a group from a plurality of individuals on a basis of individual information of each of the plurality of individuals; and a display control unit that controls a display unit to display a shape of a region occupied by the group as a group indication in a map image on a basis of a distribution of position information items of a plurality of peripheral constituent individuals that form a periphery of the group among the plurality of group constituent individuals. (2) The information processing apparatus according to Item (1), in which the display control unit controls the display unit to display, as the group indication, a boundary line formed on a basis of the distribution of the respective position information items of the plurality of peripheral constituent individuals.

(3) The information processing apparatus according to Item (1) or (2), in which the display control unit controls the display unit to display, in the map image, the group indication and an individual-number indication that indicates the number of the plurality of group constituent individuals included in the group.

(4) The information processing apparatus according to Item (3), in which the individual-number indication includes an icon having a size corresponding to the number of the plurality of group constituent individuals.

(5) The information processing apparatus according to any one of Items (1) to (4), in which the display control unit controls the display unit to display, in response to an input operation by a user to the map image in which the group indication is displayed, the individual information of one or more individuals included in the plurality of group constituent individuals.

(6) The information processing apparatus according to any one of Items (1) to (5), in which
the group extraction unit extracts, from the plurality of individuals, a plurality of individuals that have been determined to be in an aggregated state as the plurality of group constituent individuals.

(7) The information processing apparatus according to Item (6), in which
when a distance between adjacent individuals is equal to or shorter than a predetermined inter-individual distance on a basis of respective position information items of the plurality of individuals, the group extraction unit determines that the adjacent individuals are in the aggregated state.

(8) The information processing apparatus according to any one of Items (1) to (7), in which
the individual information items include group information items of groups to which the plurality of individuals respectively belong, and
the group extraction unit extracts the plurality of group constituent individuals on a basis of the respective group information items of the plurality of individuals.

(9) The information processing apparatus according to any one of Items (1) to (8), further including
an attention-needing-individual extraction unit that extracts, from the plurality of group constituent individuals, an attention-needing individual that has been determined to be in an attention-needing state on a basis of the respective individual information items of the plurality of group constituent individuals, in which
the display control unit controls the display unit to display information of the attention-needing individual as an attention-needing-individual indication in the map image.

(10) The information processing apparatus according to Item (9), in which
the individual information items include individual-identification information items that enable the plurality of individuals to be identified, and
the display control unit controls the display unit to display the individual-identification information associated with the attention-needing individual as the attention-needing-individual indication in the map image.

(11) The information processing apparatus according to Item (9) or (10), in which
the display control unit controls the display unit to display a warning as the attention-needing-individual indication in the map image.

(12) The information processing apparatus according to any one of Items (9) to (11), in which
the attention-needing-individual extraction unit determines whether or not each of the plurality of group constituent individuals is in the attention-needing state by comparing a position or movement of the plurality of group constituent individuals as a whole and a position or movement of each of the plurality of group constituent individuals on a basis of the respective position information items of the plurality of group constituent individuals.

(13) The information processing apparatus according to Item (12), in which
the attention-needing-individual extraction unit
temporally calculates, on a basis of the respective position information items of the plurality of group constituent individuals, an individual velocity vector of each of the plurality of group constituent individuals and a group velocity vector being a velocity vector of the entire group, and
determines, by comparing the group velocity vector at a first time point and the individual velocity vector of each of the plurality of group constituent individuals at a second time point before the first time point, that an individual having the individual velocity vector at the second time point corresponding to the group velocity vector at the first time point is in the attention-needing state.

(14) The information processing apparatus according to Item (12) or (13), in which
the attention-needing-individual extraction unit
calculates a center position of the plurality of group constituent individuals from the respective position information items of the plurality of group constituent individuals, and
extracts, from the plurality of group constituent individuals, an individual that is a predetermined separation distance or more apart from the center position as the attention-needing individual.

(15) The information processing apparatus according to any one of Items (9) to (14), in which
the individual information items include attribute information items of respective attributes of the plurality of individuals, and
the attention-needing-individual extraction unit determines that a group constituent individual having an attention-needing attribute is in the attention-needing state on a basis of the respective attribute information items of the plurality of group constituent individuals.

(16) The information treatment apparatus according to any one of Items (1) to (15), further including
an individual-information reception unit that receives individual information items including respective position information items of the plurality of individuals based on individual signals transmitted from transmission apparatuses attached respectively to the plurality of individuals.

(17) The information processing apparatus according to any one of Items (1) to (16), in which
the individual information items include respective position information items of the plurality of individuals, and
the group extraction unit specifies the plurality of peripheral constituent individuals on a basis of the respective position information items of the plurality of group constituent individuals.

(18) An information processing system, including:
an individual-information generation unit that generates, on a basis of individual signals transmitted from transmission apparatuses attached respectively to a plurality of individuals, individual information of each of the plurality of individuals;
a group extraction unit that extracts a plurality of group constituent individuals belonging to a group on a basis of the individual information items; and
a display control unit that controls a display unit to display a shape of a region occupied by the group as a group indication in a map image on a basis of a distribution of position information items of a plurality of peripheral constituent individuals that form a periphery of the group among the plurality of group constituent individuals.

(19) The information processing system according to Item (18), in which
the individual signals include individual-identification information items that enable the plurality of individuals to be identified,
the information processing system further includes:
an attention-needing-individual extraction unit that extracts, from the plurality of group constituent individuals, an attention-needing individual that has been determined to be in an attention-needing state on a basis of the individual information of each of the plurality of group constituent individuals; and an attribute-information storage unit that stores the individual-identification information items and attribute information items indicating attributes of the plurality of individuals to be identified by the individual-identification information items in association with each other, the individual-information generation unit generates, on a basis of information stored in the attribute-information storage unit, individual information items including the attribute information items stored in association with the individual-identification information items of the plurality of individuals from which the individual signals are transmitted, the attention-needing-individual extraction unit determines that a group constituent individual having an attention-needing attribute is in the attention-needing state on a basis of the respective attribute information items of the plurality of group constituent individuals, and the display control unit controls the display unit to display a distribution of the attention-needing individuals in the map image.

(20) An information processing method executed by an information processing apparatus, including:

extracting a plurality of group constituent individuals belonging to a group from a plurality of individuals on a basis of individual information of each of the plurality of individuals; and controlling a display unit to display a shape of a region occupied by the group as a group indication in a map image on a basis of a distribution of position information items of a plurality of peripheral constituent individuals that form a periphery of the group among the plurality of group constituent individuals.

REFERENCE SIGNS LIST 103, 203 individual-information generation unit
104 individual-information reception unit
105 group extraction unit
106, 206 display control unit
107 group-information storage unit
208 attention-needing-individual extraction unit
209 attribute-information storage unit

The invention claimed is:

1. An information processing apparatus, comprising:
a processor configured to:
extract a plurality of group constituent individuals that belong to a group from a plurality of individuals based on individual information of each individual of the plurality of individuals;
determine that an individual of the plurality of group constituent individuals is an attention-needing individual in an attention-needing state, based on individual velocity vector of each group constituent individual of the plurality of group constituent individuals and a group velocity vector of the group; and
control a display screen to display;
a shape of a region occupied by the group as a group indication in a map image based on a distribution of position information items of a plurality of peripheral constituent individuals, wherein the plurality of peripheral constituent individuals form a periphery of the group among the plurality of group constituent individuals; and
the attention-needing individual as an attention-needing-individual indication in the map image.

2. The information processing apparatus according to claim 1, wherein
the processor is further configured to control the display screen to display, as the group indication, a boundary line based on the distribution of the position information items of the plurality of peripheral constituent individuals.

3. The information processing apparatus according to claim 1, wherein
the processor is further configured to control the display screen to display the group indication and an individual-number indication that indicates a number of the plurality of group constituent individuals included in the group.

4. The information processing apparatus according to claim 3, wherein
the individual-number indication includes an icon having a size corresponding to the number of the plurality of group constituent individuals.

5. The information processing apparatus according to claim 1, wherein the processor further configured to control the display screen to display the individual information of at least one individual of the plurality of group constituent individuals based on an input operation by a user to the map image in which the group indication is displayed.

6. The information processing apparatus according to claim 1, wherein the processor is further configured to extract, from the plurality of individuals, a set of individuals that have been determined to be in an aggregated state, as the plurality of group constituent individuals.

7. The information processing apparatus according to claim 6, wherein the processor is further configured to determine that adjacent individuals are in the aggregated state based on a distance between adjacent individuals that is equal to or shorter than a determined inter-individual distance.

8. The information processing apparatus according to claim 1, wherein the processor is further configured to:
receive individual information items that include group information items of groups to which the plurality of individuals respectively belong; and
extract the plurality of group constituent individuals based on respective group information items of the plurality of individuals.

9. The information processing apparatus according to claim 8, wherein
the individual information items include attribute information items of respective attributes of the plurality of individuals, and
the processor is further configured to determine that a group constituent individual having an attention-needing attribute is in the attention-needing state based on the attribute information items of the plurality of group constituent individuals.

10. The information processing apparatus according to claim 1, wherein
the individual information includes individual-identification information items that enable the plurality of individuals to be identified, and
the processor is further configured control the display screen to display the individual-identification information items associated with the attention-needing individual as the attention-needing-individual indication in the map image.

11. The information processing apparatus according to claim 1, wherein the processor is further configured to control the display screen to display a warning as the attention-needing-individual indication in the map image.

12. The information processing apparatus according to claim 1, wherein the processor is further configured to determine whether each of the plurality of group constituent individuals is in the attention-needing state by comparison of one of a position or movement of the plurality of group constituent individuals as a whole and respective one a position or movement of each group constituent individual of the plurality of group constituent individuals.

13. The information processing apparatus according to claim 12, wherein the processor is further configured to:
determine, by comparison of the group velocity vector at a first time point and the individual velocity vector of each of the plurality of group constituent individuals at a second time point before the first time point, that the individual having the individual velocity vector at the second time point corresponding to the group velocity vector at the first time point is in the attention-needing state.

14. The information processing apparatus according to claim 12, wherein the processor further configured to:
calculate a center position of the plurality of group constituent individuals from respective position information items of the plurality of group constituent individuals; and
extract, from the plurality of group constituent individuals, a specific individual that is at least a determined separation distance apart from the center position as the attention-needing individual.

15. The information processing apparatus according to claim 1, wherein the processor further configured to receive individual information items including respective position information items of the plurality of individuals based on individual signals transmitted from transmission apparatuses attached respectively to the plurality of individuals.

16. The information processing apparatus according to claim 1, wherein
the processor is further configured to specify the plurality of peripheral constituent individuals based on the position information items of the plurality of group constituent individuals.

17. An information processing system, comprising:
a processor configured to:
generate, based on individual signals transmitted from transmission apparatuses attached respectively to a plurality of individuals, individual information items of each individual of the plurality of individuals;
extract a plurality of group constituent individuals that belong to a group based on the individual information items;
determine that an individual of the plurality of group constituent individuals is an attention-needing individual in an attention-needing state, based on individual velocity vector of each group constituent individual of the plurality of group constituent individuals and a group velocity vector of the group; and
control a display screen to display:
a shape of a region occupied by the group as a group indication in a map image based on a distribution of position information items of a plurality of peripheral constituent individuals, wherein the plurality of peripheral constituent individuals form a periphery of the group among the plurality of group constituent individuals; and
the attention-needing individual as an attention-needing-individual indication in the map image.

18. The information processing system according to claim 17, wherein
the individual signals include individual-identification information items that enable the plurality of individuals to be identified, and
the processor is further configured to:
control storage of the individual-identification information items and attribute information items indicating attributes of the plurality of individuals to be identified by the individual-identification information items in association with each other;
generate the individual information items including the attribute information items stored in association with the individual-identification information items of the plurality of individuals from which the individual signals are transmitted;
determine that a group constituent individual having an attention-needing attribute is in the attention-needing state based on the respective attribute information items of the plurality of group constituent individuals; and
control the display screen to display a distribution of attention-needing individuals in the map image.

19. An information processing method, comprising:
extracting a plurality of group constituent individuals belonging to a group from a plurality of individuals based on individual information of each individual of the plurality of individuals;
determining that an individual of the plurality of group constituent individuals is an attention-needing individual in an attention-needing state, based on individual velocity vector of each group constituent individual of the plurality of group constituent individuals and a group velocity vector of the group; and
controlling a display screen to display:
a shape of a region occupied by the group as a group indication in a map image based on a distribution of position information items of a plurality of peripheral constituent individuals, wherein the plurality of peripheral constituent individuals form a periphery of the group among the plurality of group constituent individuals; and
the attention-needing individual as an attention-needing-individual indication in the map image.

20. An information processing apparatus, comprising:
a processor configured to:
extract a plurality of group constituent individuals that belong to a group from a plurality of individuals based on individual information of each individual of the plurality of individuals;
extract, from the plurality of group constituent individuals, an attention-needing individual based on respective individual information of the plurality of group constituent individuals;
calculate, based on position information items of the plurality of group constituent individuals, an individual velocity vector of each group constituent individual of the plurality of group constituent individuals and a group velocity vector of the group;
determine, by comparison of the group velocity vector at a first time point and the individual velocity vector of each group constituent individual of the plurality of group constituent individuals at a second time point before the first time point, that an individual having the individual velocity vector at the second time point corresponding to the group velocity vector at the first time point is in an attention-needing state; and control a display screen to display:
a shape of a region occupied by the group as a group indication in a map image based on a distribution of the position information items of a plurality of peripheral constituent individuals that form a periphery of the group among the plurality of group constituent individuals; and
the attention-needing individual as an attention-needing-individual indication in the map image.

* * * * *